(12) United States Patent
Reisman

(10) Patent No.: US 7,406,436 B1
(45) Date of Patent: Jul. 29, 2008

(54) METHOD AND APPARATUS FOR COLLECTING, AGGREGATING AND PROVIDING POST-SALE MARKET DATA FOR AN ITEM

(76) Inventor: Richard Reisman, 20 E. 9th St., Apt. 14k, New York, NY (US) 10003

( * ) Notice: Subject to any disclaimer, the term of this patent is extended or adjusted under 35 U.S.C. 154(b) by 958 days.

(21) Appl. No.: 10/103,343

(22) Filed: Mar. 21, 2002

Related U.S. Application Data

(60) Provisional application No. 60/278,033, filed on Mar. 22, 2001.

(51) Int. Cl.
*G06F 17/30* (2006.01)
(52) U.S. Cl. .......................................... 705/10
(58) Field of Classification Search ................ 705/7, 705/10
See application file for complete search history.

(56) References Cited

U.S. PATENT DOCUMENTS

| | | | |
|---|---|---|---|
| 4,355,372 A | 10/1982 | Johnson et al. |
| 4,603,232 A | 7/1986 | Kurland et al. |
| 4,816,904 A | 3/1989 | McKenna et al. |
| 4,872,113 A | 10/1989 | Dinerstein et al. |
| 4,972,504 A | 11/1990 | Daniel et al. |
| 5,173,851 A | 12/1992 | Off et al. |
| 5,315,093 A | 5/1994 | Stewart |
| 5,331,544 A | 7/1994 | Lu et al. |
| 5,490,060 A | 2/1996 | Malec et al. |
| 5,687,322 A | 11/1997 | Deaton et al. |
| 5,721,693 A | 2/1998 | Song |
| 5,832,457 A | 11/1998 | O'Brien et al. |
| 5,842,199 A | 11/1998 | Miller et al. |
| 5,872,850 A | 2/1999 | Klein et al. |

(Continued)

FOREIGN PATENT DOCUMENTS

EP 0 770 967 5/1997

(Continued)

OTHER PUBLICATIONS

The Emerging Role of Electronic Marketplaces on the Internet; Yannis Bakos; Communication of the ACM vol. 41, No. 8 (Aug. 1998), pp. 35-42.

(Continued)

*Primary Examiner*—Romain Jeanty
(74) *Attorney, Agent, or Firm*—Chadbourne & Parke LLP; Walter G. Hanchuk

(57) ABSTRACT

Various systems for collecting individual post-sale market data for products or services, and determining aggregate post-sale market data therefrom, are provided. In such systems, a sale of a product or service may trigger a third party, such as a payment provider, to arrange for the collection of individual post-sale market data from the consumer. Dependent upon the type of product or service involved, a schedule for continuously submitting post-sale market data for the product or service may be provided and the consumer may be encouraged to submit post-sale market data in accordance therewith through a variety of incentives. The received, individual, post-sale market data may be aggregated by one or more sources to determine aggregate post-sale market data for the product or service. The submitted individual data and/or the determined aggregate post-sale market data may then be provided to consumers in order to assist them in making purchasing decisions.

62 Claims, 9 Drawing Sheets

U.S. PATENT DOCUMENTS

| | | | |
|---|---|---|---|
| 5,924,077 A | 7/1999 | Beach et al. | |
| 5,974,396 A | 10/1999 | Anderson et al. | |
| 5,983,220 A | 11/1999 | Schmitt | |
| 6,014,634 A | 1/2000 | Scroggie et al. | |
| 6,016,475 A | 1/2000 | Miller et al. | |
| 6,026,370 A | 2/2000 | Jermyn | |
| 6,064,970 A | 5/2000 | McMillan et al. | |
| 6,078,891 A | 6/2000 | Riordan et al. | |
| 6,108,493 A | 8/2000 | Miller et al. | |
| 6,112,186 A | 8/2000 | Bergh et al. | |
| 6,112,246 A | 8/2000 | Horbal et al. | |
| 6,308,175 B1 | 10/2001 | Lang et al. | |
| 6,321,221 B1 | 11/2001 | Bieganski | |
| 6,330,593 B1 | 12/2001 | Roberts et al. | |
| 6,334,127 B1 | 12/2001 | Bieganski et al. | |
| 6,487,541 B1 * | 11/2002 | Aggarwal et al. | 705/26 |
| 6,631,356 B1 | 10/2003 | Van Horn et al. | |
| 6,963,849 B1 * | 11/2005 | Chaturvedi et al. | 705/10 |
| 7,006,990 B2 * | 2/2006 | Stolze et al. | 705/27 |
| 7,016,854 B2 * | 3/2006 | Himes | 705/14 |
| 7,099,835 B2 * | 8/2006 | Williams, III | 705/26 |
| 7,133,834 B1 * | 11/2006 | Abelow | 705/10 |

FOREIGN PATENT DOCUMENTS

| | | |
|---|---|---|
| WO | WO 00/42544 | 7/2000 |

OTHER PUBLICATIONS

The Rating Game, Evantheia Schibsted, Business2.0 (Aug. 22, 2000).
E-Commerce the buying Game, Red Herring (Feb. 2000).
Web-based Customer Decision Support Systems ; Robert M. O'Keefe and Tim McEachern; Commun of the ACM vol. 41, No. 3 (Mar. 1998), pp. 71-78.
Everyone Is a Critic in Cyberspace:, LA Times, (Dec. 3, 1999) p. A1.
Revenge of the Know-It-Alls, Wired 8.07 (Jul. 2000) www.wired.com/wired/archive/8.07/egobbo_pr.html.
Are Shopping Bots Here to Stay?, Press Release (May 22, 2000) bots.internet.com/news/00522shopbots.htm.
Capitalist Econstruction, Wired 8.03 (Mar. 2000).
How BizRate.com Infomediates between shoppers and merchants, Jul. 19, 2000, http://www.ybn.com/ybn/ybn_external/articles/display_formats/print_this_article/1,2209,424,00.html (printed Oct. 22, 2000).
Product Reviews From Anyone with an Opinion, Bob Tedeschi, NY Times (Oct. 25, 1999).
Behind the Numbers: Which E-Commerce Site Rankings Should You Believe?, Stacy Lawrence, The Standard (Feb. 28, 2000).
Buy a Car, Get a Web Page, Mickey Alam Khan, iMarketing News, p. 1, (Dec. 11, 2000).
New World of Web Reviews, Claudia Kuehl, Internet World (Dec. 1, 1999).
BizRate.com to Acquire EBoodle, Press Release (Apr. 3, 2000) bizrate.com.
eBay Carries Out Threat and Blocks Auctionwatch.com, Press Release (Nov. 4, 1999) auctionwatch.com.
UMBC AgentWeb, Agents for Electronic Commerce, agents.umbc.edu (printed Oct. 22, 2000).
www.smartbots.com (printed Oct. 22, 2000).
Botspot Categories: Shopping Bots, www.botspot.com/s-shop.htm, (printed Oct. 22, 2000).
In Bots We Trust, NY Times (Nov. 18, 1999) G1, G25.
The Reputation Manager, Nielsen Alertbox, (Feb. 8, 1998) www.useit.com, printed Oct. 30, 1999.
Reputation Managers are Happening, Nielsen Alertbox, (Sep. 5, 1999) www.useit.com, (printed Oct. 30, 1999).
The New Road Rage: GM's wireless data service is about to turn your car into a four-wheeled vertical portal, Wired, (Jul. 1999), http://www.wirednews.com/wired/archive/7.07/gm_pr. html, (printed Dec. 7, 2000).
P3P, XNS, and Internet Privacy, XNS Public Trust Organization, (Jan. 2001), xns.org, (printed Mar. 11, 2001).
Progressive Testing New Product, Press Release (Oct. 26, 1999), www.progressive.com.
National Committe for Quality Assurance: An Overview, ncqa.org, (printed Mar. 7, 2001).
The State of Managed Care Quality, NCQA, 1999, ncqa.org, (downloaded Mar. 7, 2001).
Public Use Files Catalog, Medicare/Medicaid Data Files, (Jan. 2001), US Dept. of Health and Human Services.
XML Transformation: Matching & Reconciliation, http://www.research.ibm.com/hyperspace/mr/, (printed Feb. 19, 2001).
HealthGrades, Hospital Report Cards™ Methodology 2001 Analysis, healthgrades.com, (printed Nov. 20, 2000).
HealthGrades, Hospital Report Cards™, Analysis Report, healthgrades.com, (printed Nov. 20, 2000).
Planes, Trains, Autos Monitored from Afar, Chuck Moozakis, InternetWeek.com, (Mar. 12, 2001).
Firm Remotely Monitors Utility Meters, Jade Boyd, InternetWeek.com, (Mar. 12, 2001).
Aggregators, Madnick and Siegel, MIT Sloan School, slides presented Nov. 10, 1999 at MIT Enterprise Forum of NYC.
Agents that Buy and Sell; Pattie Maes, Robert H. Guttman and Alexandros G. Moukas; Communications of the ACM vol. 42, No. 3 (Mar. 1999), p. 81.
Collaborative Reputation Mechanisms in Electronic Marketplaces, Zacharia, G., Moukas, A., and Maes, P, Proceedings of the HICSS-99 Conference, Electronic Commerce Minitrack (Maui, Hawaii, Jan. 5-9). IEEE Computer Science, 1999.
Building Intelligent Relationships: The Firefly Tools, firefly.net.
Collaborative Filtering Technology: An Overview, No. 2 in a series, firefly.net.
Net Perceptions, Inc. White Paper, Mar. 1997, netperceptions.com.
Researcher Challenges a Host of Psychological Studies, Erica Goode, New York Times: Jan. 2, 2001.
Pay-As-You-Go Plan for Car Insurance, Matthew Wald, NY Times, (Dec. 22, 2000).
Building Consumer Trust with Accurate Product Recommendations, Greening, LikeMinds, copyright 1997, likeminds.com, (printed Jan. 4, 2001).
Semantic Ratings and Heuristic Similarity for Collaborative Filtering, Burke, at KBEM '00, Jul. 31, 2000, citeseer.nj.nec.com/article/burke00semantic.html.
consumerreview.com, (printed Oct. 25, 1999).
productopia.com, (printed Oct. 25, 1999).
deja.com, printed Oct. 25, 1999.
epinions.com, (printed Oct. 25, 1999).
epinions.com/help, (printed Jan. 13, 2001).
mysimon.com, PC Notebooks Search Results, (printed Oct. 30, 1999).
mysimon.com, Comsumer Resource Center, (printed Oct. 30, 1999).
activeresearch.com, printed Oct. 26, 1999.
Active Buyer's Guide, Press Release Aug. 17, 1999, activeresearch.com.
Smartmouth.com, printed Feb. 26, 2001.
epubliceye.com/faq, printed Oct. 22, 2000.
reputation.com, printed Apr. 8, 2001.
Amazon.com zBubbles, amazon.com, printed Dec. 3, 1999.
alexa.com, printed Nov. 1, 1999.
gomez..com, printed Jan. 13, 2000.
exp.com, (exp.advoco.com), printed Nov. 7, 1999.
The Feed back Forum, ebay.com, printed Nov. 1, 1999.
Consumersearch.com, printed Oct. 20, 2000.
Birate.com, printed Nov. 1, 1999.
OpenRatings.com, printed Oct. 23, 2000.
MIT Media Lab E-Commerce Guru Pattie Maes Debuts New Venture, Press Release, Feb. 1, 2000, OpenRatings.com, printed Oct. 27, 2000.
Open Ratings Alliances, OpenRatings.com, printed Oct. 25, 2000.
Open Ratings Product Overview, PDF file received Oct. 27, 2000.
Open Ratings Technical Overview, PDF file received Oct. 27, 2000.
Directions for Element Managers and Network Managers, Garg, et. al., IEEE Communications Magazine, Oct. 1998.

TMN Standards, Sidor, IEEE Communications Magazine, Mar. 1998.
SNMPv3, Stallings, IEEE Communications Surveys, Fourth Quarter 1998.
IT Asset Management—Start With a Needs Analysis, Husselbaugh, Giga Information Group, Sep. 21, 2000.
Six Degrees of Integration: From Network Management and Systems Management to IASM, Cappelli, Giga Information Group, Oct. 8, 1998.
Network Management: A Tutorial Overview, Caruso, IEEE Communications Magazine, Mar. 1990.
Common Information Model (CIM) Specification Version 2.2, Jun. 14, 1999.
Desktop Management Interface Specification v2.0s, Introduction and Overview, Jun. 24, 1998.
Market Overview IT Asset Management, Part 1 Apr. 11, 2000, Part 2 May 14, 2000, Part 3 May 18, 2000, Kriebel, Giga Information Group.
Criteria for Evaluating Vendlor Server/Deswktop Management Tools, Friedlander, Giga Information Group, Oct. 27, 1998.
From Frameworks to Suites—The Next Wave in Distributed Systems Managment, Gliedman, Giga Information Group, Apr. 30, 1997.
Desktop Management Interface Dogged by Drawbacks, Kriebel, Giga Information Group, Nov. 22, 2000.
CIM Standards, DEN, WBEM, www.dtmf.org, printed Dec. 3, 2000.
General Motors—Safety: OnStar Looks to Future Technologies, senseabledriving.com, printed Dec. 7, 2000.
Telematics Suppliers Consortium, Telematics End-to-End Architecture, Slide 13, Mar. 17, 1999.
AMI Software Requirements, Ito and Prasad, AMI-C 1999 Supplier Conference, Apr. 26, 1999, http://www.ami-c.com/pdf_files/AMIsoftware1.pdf.
The coming revolution in Telematics '99, http://www.japaninc.net/computingjapan/features/features11.html, printed Dec. 7, 2000.
Carrier Announces Web and WAP-enabled HVAC equipment, press release, myappliance.com, printed Apr. 16, 2001.
Energy Firms Use Web to Drive Down Cost, wsj.com, Apr. 30, 2001.
Voices Events With . . . Ed Cannon, wsj.com, Apr. 30, 2001.
esubstation.com, printed May 1, 2001.
Oreda Offshore REliability DAta, www.sintef.no/sipaa/prosjekt/oreda/, printed Dec. 3, 2000.
Evolution of Operation Experience Collection Methods, H. Sandtorv, J. Vatn (SINTEF), ESReDA 19th international seminar Oct. 5-6, 2000.
Problems and solutions with the collection of reliability data from different data sources, H.A. Sandtorv, et. al., EsRel'99, Sep. 99.
OREDA Newsletter, Issue 8 Sep. 2000, Issue 7 May 1999, Issue 6 Aug. 1998, Issue 5, Dec. 1997, Issue 3, Sep. 1995.
Reliability Information in a Competitive Market (Abstract), Billington, et.al., Power Engineering Society Summer meeting, Jul. 16-20, 2000, IEEE.
Experiences with the FASIT Reliability Data Collection System (Abstract), Heggset, et.al., Power Engineering Society Winter Meeting, Jan. 23-27, 2000, IEEE.
Entek White Papers, entek.com, printed Dec. 5, 2000.
Market Data, McEachern, Wall Street & Technology, May 2001, p. 11.
MDDL—Mapping the Market Data Genome with the Market Data Definition Language, mddl.org/links/octupgrade.asp, printed Mar. 19, 2002.
All Eyes on the Market Data Horizon, McEachern, Wall Street & Technology, Mar. 2001, p. 36.
Data Cleansing Products to Save Industry Time and Money, McEachern, Wall Street & Technology, Mar. 2001, p. 40.
External Redistribution, www.fisd.net, printed Feb. 24, 2001.
SEC Dec. 14 Meeting Examines Alternative Models for Consolidation of Market Data, Dec. 28, 2000, http://www.fisd.net/mdregulation/secappt1200b.asp.
Summary of SEC Concept Release on Regulation of Market Information Fees and Revenues Jan. 13, 2000, http://www.fisd.net/mdregulation/SECCRSum2000March23.asp, printed Feb. 24, 2001.
SEC Concept Release: Regulation of Market Information Fees and Revenues, 17 CFR Part 240 [Release No. 34-42208; File No. S7-28-99], Regulation of Market Information Fees and Revenues, p. 1-9, Modified: Dec. 10, 1999, http://www.sec.gov/rules/concept/34-42208.htm, printed Feb. 24, 2001.
Distributions, http://www.qualityamerica.com/knowledgecente/knowctrDistributions.htm, printed Jan. 14, 2001.
Control Chart Properties, http://www.qualityamerica.com/knowledgecente/knowctrControl_Chart_Properties.htm, printed Jan. 14, 2001.
Control charts interpretation, http://www.qualityamerica.com/knowledgecente/articles/CQEIVH3d.html, printed Jan. 14, 2001.
Limit for X-bar chart, http://www.iso.gmu.edu/~falemi/cqi/xchart2.htm, printed Jan. 14, 2001.
The Design of a Fuzzy-Shewhart Control Chart, J. Höppner and H. Wolff, Research Report 52 of the Würzburg Research Group on Quality Control, Mar. 1995, http://www.mathematik.uni-ulm.de/stochastik/fundl/paper/wolff/fuzzy1/fuzzy1.html.
Receiver operating characteristic curves and optimal Bayesian operating points, Kanungo et.al., Proc. of IEEE Int. Conf. on Image Processing, Washington, D.C., Oct. 1995, vol. 3, pp. 256-259.
Feature Selection in Web Applications Using ROC Inflections, Coetzee et. al., Symposium on Applications and the Internet, Jan. 8-12, 2001, IEEE, p. 5-14.
Bayesian Classification and Feature Selection from Finite Data Sets, Coetzee, et.al., Sixteenth Conference on Uncertainty in Artificial Intelligence (UAI-2000), Jun. 30-Jul. 3, 2000, pp. 89-97, citeseer.nj.nec.com/coetzee00bayesian.html.
Multi-Product Delivery System Optimization Procedure, IBM Technical Disclosure Bulletin, Apr. 1995, p. 501-504.
MobShopBusiness.com, printed Nov. 21, 2000.
J. D. Power Awards, Press Release, May 4, 2000, jdpower.com.
Agile Buyer, Electronic Commerce is Now and Imperative, White Paper, downloaded Nov. 26, 2000.
Agile Anywhere, A Standards-Based Solution for the e-Supply Chain, White Paper, downloaded Nov. 26, 2000.
Agilesoft.com/corporate, printed Nov. 26, 2000.
About @pos.com, www.atpos.com/about.html, printed Nov. 26, 2000.
Dialog Classic Web search results, printed Nov. 10, 2000, p. 1-49 (contains following items): p. 1-27, item: 1999 Honomichl global top 25 (market research firms), Aug. 16, 1999; p. 27-8, item: @pos.com and Hand Held Products, Mar. 7, 2000; p. 28-41, item: Buyers Guide to Software for Purchasing, Jul. 13, 2000; p. 41-45, item: IRM Seeks Ways to Expand Use of Sales Data in Vending, Nov. 1999; and p. 45-49, item: The View from the Top: The Information Gurus for the Three Big Foodservice Operators, Nov. 3, 1997.
Net Worth, Hagel and Singer, HBS Press, 1999, p. 30-31, 111, 126, 184-185, 220-223, 248-250.
US6047266, Patent abstract, Pub. Date Apr. 4, 2000, printed from esp@cenet, Oct. 21, 2000.

* cited by examiner

| ITEM TYPE IDENTIFIER 402 | ITEM CLASS IDENTIFIER 404 | NUMBER OF SUBMISSIONS 406 | SUMMARIZED POST-SALE MARKET DATA 408 |
|---|---|---|---|
| 1991 FORD | AUTOMOBILE | 2130 | 6.35 |
| 1998 SATURN | AUTOMOBILE | 1441 | 8.25 |
| 2001 MERCURY | AUTOMOBILE | 10135 | 8.66/$18500 |
| 2002 KIA | AUTOMOBILE | 42 | 7/$12000 |

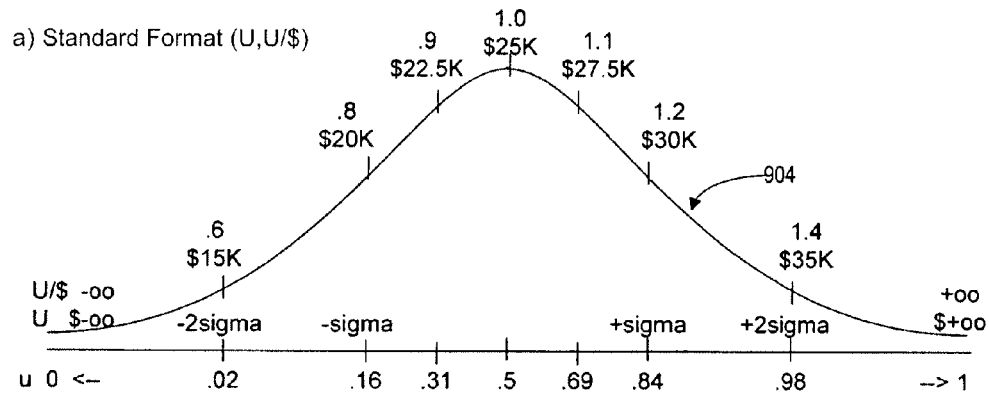
a) Standard Format (U, U/$)
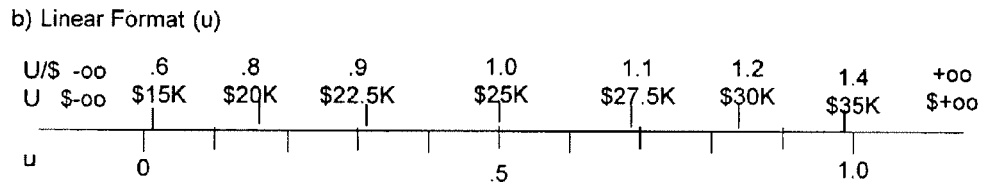
b) Linear Format (u)
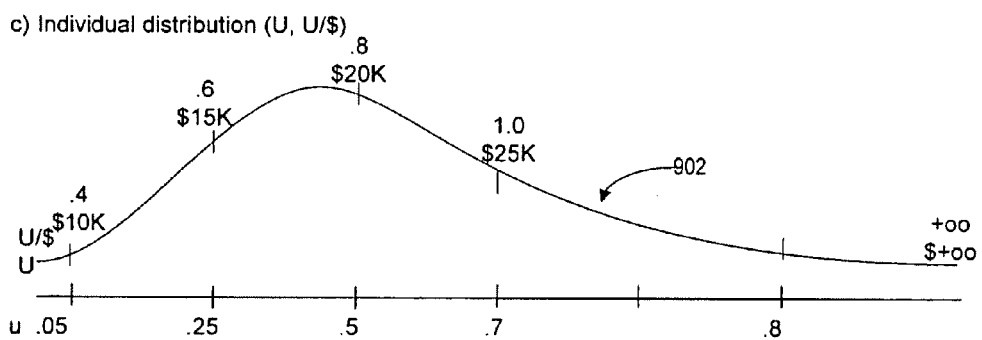
c) Individual distribution (U, U/$)
d) Normalization Mapping:
| | Individual | | | Normalized | |
|---|---|---|---|---|---|
| cases | u | U/$ | U | U/$ | U |
| | .75 | 1.04 | $26K | 1.08 | $28K |
| | .5 | .8 | $20K | 1.0 | $25K |
| RATINGS | .25 | .6 | $15K | .9 | $22K |
| DISTRIBUTION | .05 | .4 | $10K | .4 | $10K |
FIG. 9

METHOD AND APPARATUS FOR COLLECTING, AGGREGATING AND PROVIDING POST-SALE MARKET DATA FOR AN ITEM

RELATED APPLICATION DATA

This application claims priority under 35 U.S.C. §119 to U.S. Provisional Patent Application Ser. No. 60/278,033 entitled "METHOD AND APPARATUS FOR COLLECTING, AGGREGATING AND PROVIDING POST-SALE MARKET DATA FOR AN ITEM" filed on Mar. 22, 2001 in the name of Richard Reisman, and incorporated herein by reference.

FIELD OF THE INVENTION

The present invention is directed generally to the collection and exchange of market data, and is directed more particularly to the collection and aggregation of post-sale market data (PSMD) from individual consumers regarding products and services, and the provision of aggregated post-sale market data for use by consumers in making purchasing decisions.

BACKGROUND OF THE INVENTION

The practice of collection, aggregation, and distribution of market data that relates to point- or time-of-sale transaction data for financial and physical commodity products is well established. Financial market data is the basis for a multi-billion dollar industry upon which the financial markets depend, and commodity market data is similarly relied upon by traders. Such at-sale market data is relatively simple in content, but takes on richness in its collection, aggregation, distribution and analysis, and supports a rich industry ecology. Practices that roughly correspond, but relating to post-sale market data that are applicable to differentiated non-commodity products and services as described herein are almost totally lacking.

A major reason for this is that commodity products (physical and financial) are standardized with specified characteristics and grades that are reliably realized, so that there is little or nothing to be learned about an item post-sale, and a combination of pre-sale descriptors and at-sale data (such as bid/asked/sale price and volume) are sufficient to fully inform buyers. Markets for non-commodity products (and services) have not developed in the same way because of the products' non-standard, differentiated, nature, including the diversity of origin and nature, and the resulting diversity of post-sale experience to be expected. Marketers seize on this to emphasize product differentiations which may be real or just claimed without foundation, so that price alone is of limited significance. The improved communications capabilities of the Internet and related information technologies may enable dramatic enhancements in the market processes for products of all kinds, and particularly may enable for non-commodity markets for differentiated products the development of some of the features of commodity markets, such as price-comparison tools and auctions. Some aspects of this potential have been recognized, particularly with regard to pre-sale and at-sale transaction activities, but the potential to apply such communications to enable new methods for widespread collection and use of new kinds of post-sale market data to support new methods to better inform market actions remains almost completely unrecognized and undeveloped.

Since its inception in the early 1990's, the Internet and the Web have become an increasingly popular source for both information and shopping. In this regard, consumers (also referred to herein as "buyers" or "users") typically use the Internet to (1) locate vendors for desired items, (2) view information on items prior to purchase and (3) complete a purchase of desired items online. Searches for such items can be completed in various manners, such as by general web searches, reviewing particular vendor sites or virtual shopping malls, use of software shopping agents or "bots," and the like. This applies to both individual consumers, and business-to-business consumers.

Consumers, however, have limited resources by which to evaluate the usefulness or utility of an item, such as a product or service, as determined by prior purchasers. Such information will be referred to herein as "post-sale market data" or "market data." Examples of such post-sale market data include a continuous or periodic evaluation by consumers of the utility of an item over a period of time or the operational history (i.e. a maintenance history) of an item.

Most often, the information available to consumers online about a particular item is generated by manufacturers or providers. This information usually is indicative only of the configuration and price of the item for sale, including nominal specifications of capabilities and capacities which may or may not be realistic and deliverable in practice. Typically, the information provided by these parties may be silent or severely limited as to the overall realized utility of an item as determined by prior purchasers of the item. Manufacturers have, as is well known in the art, collected operational history data in the form of tracking repairs performed on items that they manufacture. Warranty service on automobiles is one such example. However, no individual or aggregate, post-sale market data has been previously made available from such manufacturers and service providers to consumers for assisting them in making purchasing decisions.

Some limited post-sale market data has been provided by third party ratings services for use by consumers. However, the information generated by these third parties is generally limited to a particular group of items and/or fail to provide continuous or periodic consumer-generated post-sale market data. Traditional examples of such third party evaluation services include: CONSUMER REPORTS, which provides independent evaluations of products and services without consumer input and ZAGATS SURVEY, which produces ratings of restaurants based on customer surveys, but does not seek continuous review of such restaurants by individual consumers.

Other third party ratings services have appeared recently on the Internet. Services such as EPINIONS, PRODUCTOPIA, DEJA, and CONSUMERREVIEWS address particular item information, but there are no provisions or incentives for consumers to provide continuous or periodic post-sale market data on a purchased item. These sources are, furthermore, proprietary in nature, they generally emphasize anecdotal reviews, with only limited use of quantitative ratings, and they rely on users to spontaneously offer ratings at whatever time they choose to visit the service's Web site. That is, there are no provisions to aggregate post-sale market data from multiple sources for a particular item in order to generate useful, consistent, and broadly-based post-sale market data to consumers. As a result, such services are of very limited value.

Other services such as OPEN RATINGS and BIZRATE. COM seek consumer evaluations of the ease of doing business with, and integrity of, the parties offering products or services over the Internet, and obtain ratings of merchants or suppliers or marketplaces as agencies, rather than evaluating the actual items purchased. Such services may be triggered at the point of sale, but do not obtain data on the purchased items. Another service, ALEXA.COM, seeks consumer evaluations of the value of Web sites. All of these sources are again proprietary in nature, and again have no provisions to aggregate post-sale market data from multiple sources for a particular item in order to generate useful and broadly-based post-sale market data to consumers.

As a result, there is a need for a service through which post-sale market data is collected from a broad group of consumers for a wide-variety of products and services who are actively solicited to participate at one or more relevant times in the life-cycle of use, aggregated in a standard format, and provided to consumers in order to assist purchasing decisions, preferably with a range of value-added support services for access and analysis that may be provided in an open market. Such a service is heretofore unknown in existing technologies.

SUMMARY OF THE INVENTION

One aspect of the present invention includes a method and accompanying apparatus for collecting post-sale market data for a third party product. According to this embodiment, an indication of a sale of an item to a consumer is received. A unique identifier is then established which corresponds to the item. After the sale, at least one element of post-sale market data corresponding to the identifier is received. The post-sale market data may be a rating, an indication of the utility of the item as perceived by the consumer. The utility may, furthermore, be correlated to the price of the item. Alternatively, the post-sale market data may instead be operational data relating to the item, such as performance history or maintenance requirements for the item over time. The item may be any product or service available in the marketplace.

A second aspect of the present invention includes a further method and accompanying apparatus for collecting post-sale market data for a third party product. According to this embodiment, an indication of a sale of an item to a consumer is received. A schedule for submitting at least one element of post-sale market data for the item is then established. This schedule may, for example, be based on the class of the item, its expected lifetime or any other suitable factor. At least one element of post-sale market data, whether a rating or operational data report, for the item may then be received from the consumer in accordance with the schedule.

A third aspect of the present invention includes a method and apparatus for initiating a collection of post-sale market data for a third party item. An indication of a sale of an item is transmitted to a central server over a computer network. This may be accomplished via a third party payment processor, a merchant's transaction processing system, or the like. The central server then generates and transmits a request to the consumer to provide at least one scheduled element of post-sale market data for the item.

A further aspect of the present invention includes a method and apparatus for initiating the submission of post-sale market data. A purchase of an item from a merchant is initiated. An acknowledgement of the purchase is then transmitted to a central server. In response, the central server generates and transmits a request to provide at least one element of post-sale market data for the item to the consumer. The consumer may then transmit an agreement to provide the at least one element of post-sale market data.

Yet another aspect of the present invention includes a method and apparatus for facilitating the collection of post-sale market data for a third party item. According to this embodiment, a sale of an item to a consumer is completed. An identification of the sale and the consumer may then be transmitted to a central server. In response, the central server may transmit a request for the consumer to provide at least one element of post-sale market data of the item. The request is then presented to the consumer.

A further aspect of the present invention includes a smart device which may be used to (1) record operational data for the product; and (2) transmit the operational data to a third party information provider via a communication device, such as a network connection. The operational data may be used by the third party provider to generate post-sale market data for a class of products to which the smart device belongs. Such post-sale market data may then be communicated to a plurality of consumers.

A further aspect of the present invention includes a method and apparatus for aggregating post-sale market data. According to this embodiment, a third party aggregator accesses a plurality of databases maintained by a plurality of sources which contain post-sale market data for a class of items. Alternatively, the source may forward the post-sale market data to the third party aggregator on a regular or continuous basis in the form of a data feed, which can then be used to create and maintain such databases. The post-sale market data is converted to a standard format, and a summary of the post-sale market data is generated for the class of items based on the converted post-sale market data.

Yet another aspect of the present invention includes a method and apparatus for collecting post-sale market data. According to this embodiment, a purchase event for an item is identified. The purchase event is reported to a third party information aggregator and submission of post-sale market data to the third party information aggregator is enabled for the consumer involved in the purchase event.

BRIEF DESCRIPTION OF THE DRAWINGS

Further aspects of the instant invention will be more readily appreciated upon review of the detailed description of the preferred embodiments included below when taken in conjunction with the accompanying drawings, of which:

FIG. 4 is a schematic diagram of an exemplary aggregate post-sale market data information database stored by the server of FIG. 2;

FIG. 9 is a graphical representation of an exemplary process for conversion and normalization of data.

DETAILED DESCRIPTION OF THE INVENTION

Figure 1:
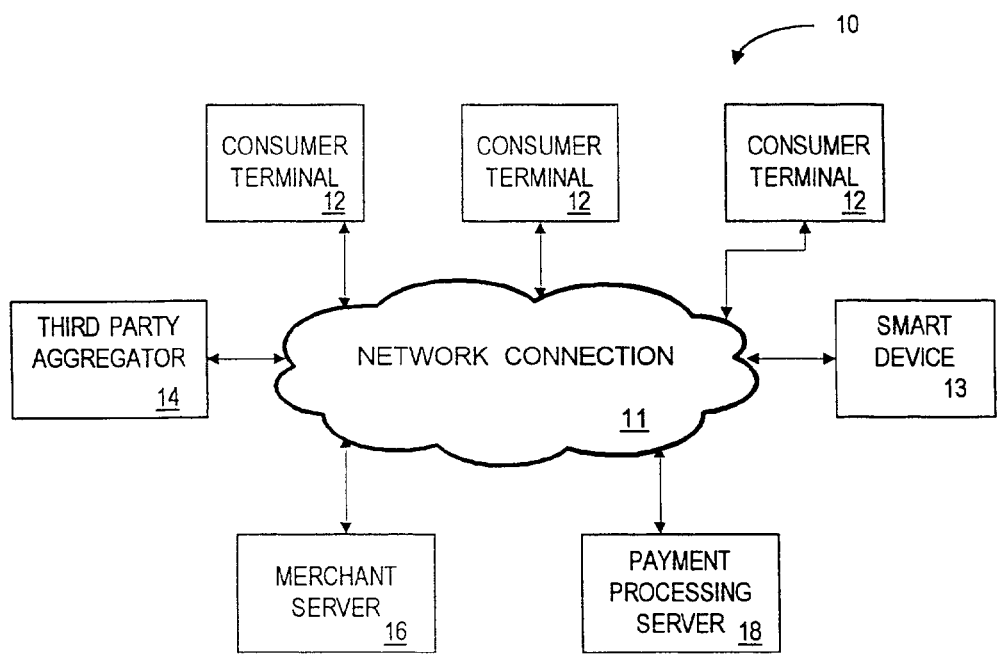
FIG. 1 is a block diagram of an exemplary computer network for implementing certain embodiments of the present invention.

As used herein, the terms "post-sale market data" or "user-generated market data" or "consumer-generated market data" are meant to refer to one or both of "rating data" and "operational data." "Rating data" refers to a consumer-generated rating of an item, such as a product or a service. The rating is intended to be an indication of a consumer-perceived utility or usefulness of the item. A rating may be provided as a numerical scale with a predetermined range, i.e. 1 to 10, where 1 indicates a low level of utility and 10 indicates a high level of utility. Other scales may be provided and used with the present invention, including scales having negative values. Ratings may also include component ratings that address specific aspects of overall utility, such as power, durability, appearance, and the like.

"Operational data" as used herein refers to actual operating statistics related to a product or service. Such operating statistics will vary based on the item involved. In the case of an automobile, for example, "operational data" may refer to a maintenance history of the vehicle, i.e. the number of times the vehicle was repaired in a given period of time, and the types of repairs involved, as well as usage history, i.e. the mileage, average speeds, and fuel economy, as well as data relating to cost of ownership, i.e. gas mileage, repair costs, and insurance costs. Operational data may be submitted periodically by a consumer or may be submitted by a smart device which is programmed to report its operational capacity at predetermined intervals. Operational data can also be understood to be an objective counterpart to subjective rating data, and the term rating data may at times be used to refer generically to both kinds of post-sale market data. In either case, submission by a consumer is meant to include submission by a software agent operating on behalf of the consumer.

"Utility" as used herein refers to a consumer's perception of the usefulness of an item. The numerical values associated with utility may not have any quantifiable units associated therewith, although a dollar or other monetary-denominated scale may also be useful. However, it should be readily understood that utility can be successfully approximated through a ratings scale, as described herein. "Utility" is to be readily distinguished from "Utility per dollar" as described herein, wherein the latter term describes a ratings scale modified by the price of the item. It should be further understood that the price may be expressed in any currency other than dollars.

"Consumer" as used herein refers to any consumer, buyer, purchaser or user of an item in a broad sense. This may be a private individual in respect to a so-called "consumer" product or service item, or it may be one or more representatives of a business in respect to a business product or service item. "Consumer" may also refer to a user of an item who is not the actual purchaser.

"Indication of sale" as used herein refers to any means of identifying consumers of an item at any point in its usage life-cycle. Identifying "triggers" ("triggering events") that occur at the point (and/or time) of sale are preferable in reaching consumers early in the life-cycle, but other triggers such as delivery, maintenance, add-ons, or other after-market activity may be used as complements or alternatives.

"Item" as used herein refers to an individual "unit" or instance of any product or service, as delivered to and used by a consumer. This may include items provided at no charge, and items that are "virtual" such as Web pages or sites or other information products or services. Multiple associated items may be considered as a "group" of items, and "taxonomies" may relate these groupings in defined ways. One useful group is all item instances of the same particular product or service as characterized by make and model and such other major attributes, such as model year, that are major differentiators in the selection of an item to be purchased, referred to as an item "type." The term "item" may also be used herein as a shorthand term for the item type, which will usually be obvious in context. Taxonomies may define one or more hierarchies of such groupings that may relate item groups into "classes" which may be by source and model, such as Accord LXI, Accord, Honda, and/or by generic "category," such as mid-size sport sedan, sedan, automobile, motor vehicle. Note that the term "class" is meant to include the "type" as a specific kind of class. "Sub-groups" may involve secondary variations in item features, such as options that may or may not be selected, such as automatic transmission, sport suspension, and the like.

"Marketplace" as used herein refers broadly to any locus of buying and selling. This can include "merchants" or retailers who buy product inventory and sell directly to consumers, and the brokers or other intermediaries who simply provide a meeting place or other support services for matching buyers and sellers. The latter includes the narrower usage of "marketplace" as is currently common in e-commerce. Thus a "marketplace server" should be understood to include merchant servers operated by a retailer as well as third party market-matching servers that serve multiple sellers.

"Analysis" and "data mining" as used herein are broadly interchangeable. Both are meant to address the processes of selecting, filtering, cleaning, transforming, and normalizing raw data, database searching, processing, and associated data feed handling, and the various mathematical, statistical, visualization, and presentation methods used to enable users to control how they process and draw inferences from such data.

"Aggregation" as used herein is meant to broadly include the various aspects and levels of collecting data sets from consumers, processing, summarizing, and aggregating such data set collections, and providing access or distributing post-sale market data to data users or other parties, as described below, and to include the more specific case of pure aggregation of multiple sets of data. Thus the broader meaning of collector/aggregator is generally included, except where a more specific meaning is suggested. The term "second-tier aggregation" is used to more specifically refer to cases where multiple collected sets of PSMD are combined into a "superset" collection, and is meant to include possible further tiers of aggregation unless otherwise qualified. This second-tier aggregation may also be termed "consolidation," a term used in financial market data systems to refer to the process of combining individual real-time data streams or feeds from each of multiple marketplaces (that report trades of a financial product) into a consolidated feed (that includes all such trades). Aggregation may also refer to both the narrow aspect of aggregation of individual data as individual data and more broadly to include the reduction of individual data into summarized form.

With these definitions in mind, the present invention can be described, in various embodiments, as a system for collecting post-sale market data from individual consumers for a plurality of items, aggregating the post-sale market data based on the class or type of item involved, and enabling consumers to view both the individually-submitted post-sale market data and the aggregated data in order to facilitate purchasing decisions.

It is contemplated that the collection mechanism for the present invention may be triggered by a sale of an item. The sale may take place online or offline. In an online embodiment, for example, a consumer may purchase an item from a vendor over the Internet. The sale may be accomplished through the consumer's use of a standard web browser. Alternatively, the consumer may use a software shopping agent or shopping bot, to initiate a sale. The sale, in turn, may trigger a software function by which the consumer is queried as to whether he or she wishes to submit post-sale market data, in the form of ratings and/or operational data, for the item sold. The consumer may optionally be offered various incentives in exchange for participation. Such incentives may include a rebate on the purchase, a credit towards a further purchase, and/or non-currency awards, such as free access to aggregated post-sale market data for a variety of products, frequent flier miles, or Web points, or pre-paid telephone time. If the consumer agrees to participate, a schedule for the submission of post-sale market data may optionally be provided. The schedule may include a period of time in which one or more instances of post-sale market data are to be provided. If the consumer submits post-sale market data in accordance with the schedule, the consumer continues to receive the incentive.

In an exemplary offline embodiment, a traditional sale may take place at a merchant's location. The sale, while being completed at a merchant's transaction processing system (such as a point-of-sale terminal (POS)), triggers a function by which the consumer is queried as to whether he or she wishes to submit post-sale market data for the item. The consumer may agree to participate at either the time of sale or thereafter. Notification to the consumer in an offline embodiment may take place at the POS, through a payment processor, such as a credit card or debit card payment processor, as a byproduct of a manufacturer warranty registration process, or through a consumer-operated device, such as a smart card that is used to complete the sale. Various other consumer devices may also be used to provide such notification and other triggering events may be used to trigger solicitation of the submission of market data from the consumer, as described further below.

Turning now to the aggregation component of the present invention, it is contemplated that aggregated post-sale market data may be generated from numerous individual post-sale market data submissions which are received from various consumers for a variety of items. The aggregation component may additionally aggregate data from a plurality of post-sale market data collection sources other than consumers, such as from manufacturers, vendors, other ratings or operational data collectors (each with its own set of consumer submission sources), and the like. The aggregated data may be used to generate overall utility statistics of the various items being tracked. This aggregated data may then be provided to a plurality of consumers who have access to the data in order to assist in purchasing decisions.

As part of the aggregation process, individuals may be evaluated to determine their rating behavior. For example, certain consumers may consistently rate items in either too harsh or too forgiving a manner, when compared to other consumers rating an item, or with a consistent pattern of unusually high or low deviation from an average rating. The system of the present invention, in certain embodiments, may then adjust these consumers' ratings in a statistically-appropriate manner. In addition, the aggregation process may include a statistical analysis by which aggregated data is adjusted to provide a uniform distribution of ratings among the plurality of consumers submitting post-sale market data.

A distribution component may be provided which allows consumers and the like to access aggregated and/or individual post-sale market data for an item. Aggregated or individual data may be distributed in real time. The distribution component may be hosted on a centrally-accessible computer network, such as on a web site on the Internet. While aggregated summary data may be provided without any privacy concerns, access to the individual data may be arranged such that submitting consumers cannot be readily identified. This may be assured by providing an identifier corresponding to each submitting consumer, rather than supplying information by which a consumer may be identified. The identifier should be specific to a single collection source and the consumer's identification data should preferably be restricted to the original third party aggregator that collected the personal information, unless permission from the consumer to release such information has been given.

In order to fund the development and continuing operation of the system of the present invention, it is contemplated that a variety of revenue-generation techniques may be employed. For example, consumers may be charged a fee to access the individual or aggregate post-sale market data. The fee may be charged as a subscription or membership fee which entitles a consumer to access the data as a subscriber for a predetermined period of time, or the fee may be charged on a per-access basis. Fees may further be based upon the type of data that is being accessed. In addition, advertisers may pay a fee to place advertisements along with the individual or aggregated post-sale market data. Alternatively, the individual or aggregated data may be licensed for a fee to other parties for their use. Merchants and marketplaces, as well as manufacturers and service providers, may pay fees for detailed data specific to their consumers for their own market research and customer relations uses, and may provide incentives to encourage those consumers to provide data. They may also pay to sponsor access to such data for their consumers, on a flat fee or transaction basis. Other licensees may include print publishers such as consumer or trade publications and online publishers such as portals or shopping information sites, and other purchasers and resellers of market research data and reports. Additional funding may be in the form of revenue for value-added and supporting services, including providers of analytic, data mining, and decision support tools, including shopping and asset management bots or agents, and providers of infrastructure such as for servers and data interchange.

Referring now to FIGS. 1-7, wherein similar components are referenced in like manner, various features for a method and apparatus for collecting, aggregating and providing post-sale market data for an item are disclosed.

Turning now to FIG. 1, there is depicted an exemplary computer network 10 through which a plurality of consumers operating consumer terminals 12 may communicate with one or more third party aggregator servers 14 over network connection 11 in order to submit or view post-sale market data. In addition, one or more marketplace servers 16 may also be in communication with the third party aggregator server 14 to provide notification of sales and may further communicate with the payment processing server 18 to complete sales transactions with consumers. In alternate embodiments, the third party aggregator server 14, the marketplace server 16 or the payment processing server 18 may host the collection of post-sale market data from a consumer, as discussed further herein. Smart device 13 may also participate as a source of operational data.

Although computer network 10 is preferably an Internet-based network such as the World Wide Web, it may be any one or more of a local area network (LAN), a wide-area network (WAN), an intranet environment, an extranet environment, a wireless network or any other type of computer network, such as those enabled over public switched telephone networks.

Consumer terminals 12 may each be any type of computing device, such as a personal computer, a workstation, a network terminal, a hand-held remote access device, a personal digital assistant (PDA), a smart phone or any other device that can accomplish two-way electronic communication over the network connection 18. Consumers may run a web browser or the like on consumer terminal 12 to communicate with the third party aggregator server 14. It should be understood that consumer terminals 12 may also take the form of combinations of multiple such computing devices, with portions of the functions operating on one or more personal computers, PDAs, or other devices, or on third party servers providing Web services or acting as application service providers (ASPs).

Third party aggregator server 14 may be one or more servers which cooperate to collect, aggregate and distribute post-sale market data. In a case where multiple servers act as third party aggregator server 14, such multiple servers may be independently or jointly operated. The data may be collected in different formats and later combined into a standard format during an aggregation process.

Marketplace server 16 may be operated on a central computer network, such as the Internet, to effectuate online sales. Alternatively, or in addition thereto, the marketplace server 16 may be a transaction processing system operated at a merchant's store location.

Payment processing server 18 may be an independent payment clearance system, such as a credit card clearinghouse, which processes consumer payments in a traditional manner. It may also be a provider of virtual payment services, including wallets, virtual cash, micropayments, or incentives points.

Other specific functions and operations of consumer terminals 12, third party aggregator server 14, seller servers 16 and payment processor server 18 are discussed further below.

Figure 2:
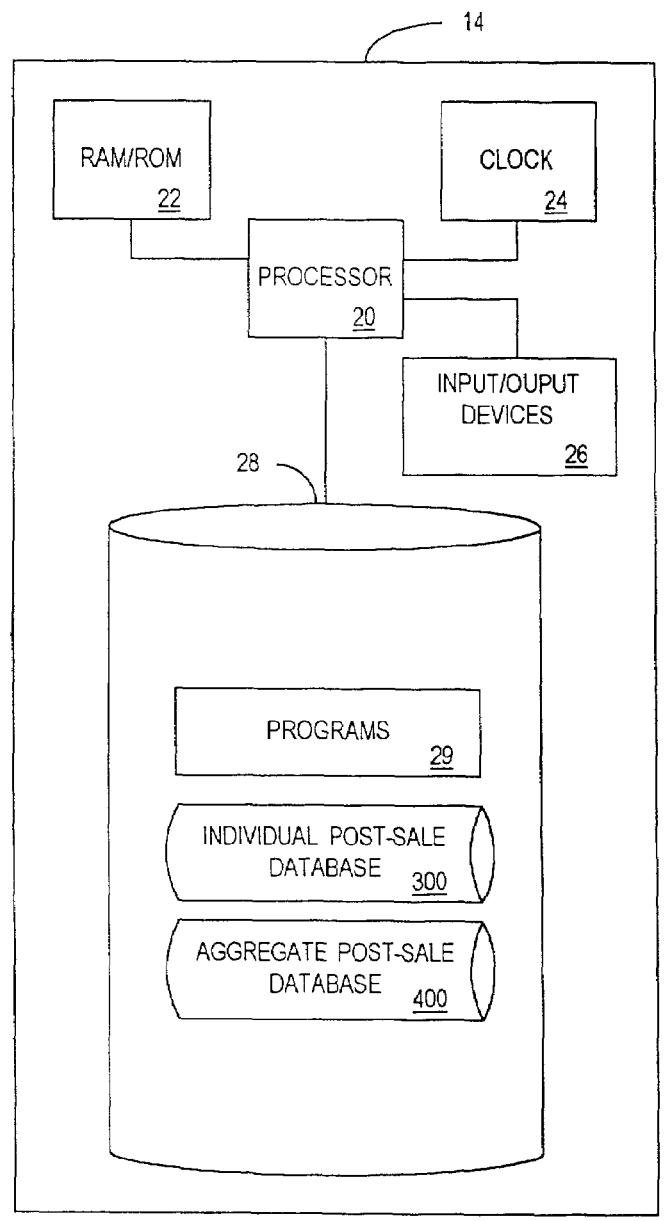
FIG. 2 is a schematic block diagram of an exemplary third party aggregator server according to certain embodiments of the present invention.

Turning now to FIG. 2, displayed therein are exemplary components of a computing device, such as third party aggregator server 14. It should be understood that any of consumer terminals 12, marketplace server 16 and payment processing server 18 may share similar configurations. However, for sake of brevity, the discussion immediately below will refer to the third party aggregator server 14 only The primary component of the third party aggregator server 14 is a processor 20, which may be any commonly available microprocessor, such as the PENTIUM III manufactured by INTEL CORP. The processor 20 may be operatively connected to further exemplary components, such as RAM/ROM 22, a clock 24, input/output devices 26, and a memory 28 which, in turn, stores one or more computer programs 29, an individual post-sale market database 300, and an aggregated post-sale market database 400.

The processor 20 operates in conjunction with random access memory and read-only memory in a manner well known in the art. The random-access memory (RAM) portion of RAM/ROM 22 may be a suitable number of Single In-line Memory Module (SIMM) chips having a storage capacity (typically measured in kilobytes or megabytes) sufficient to store and transfer, inter alia, processing instructions utilized by the processor 20 which may be received from the application programs 29. The read-only memory (ROM) portion of RAM/ROM 22 may be any permanent, non-rewritable memory medium capable of storing and transferring, inter alia, processing instructions performed by the processor 20 during a start-up routine of the third party aggregator server 14.

The clock 24 may be an on-board component of the processor 20 which dictates a clock speed (typically measured in MHz) at which the processor 20 performs and synchronizes, inter alia, communication between the internal components of the third party aggregator server 14.

The input/output device(s) 26 may be one or more commonly known devices used for receiving system operator inputs, network data, and the like and transmitting outputs resulting therefrom. Accordingly, exemplary input devices may include a keyboard, a mouse, a voice recognition unit and the like for receiving system operator inputs. Output devices may include any commonly known devices used to present data to an system operator of the third party aggregator server 14 or to transmit data over the computer network 10 to, for example, the consumer terminals 12.

Accordingly, suitable output devices may include a display, a printer and a voice synthesizer connected to a speaker. Other input/output devices 26 may include a telephonic or network connection device, such as a telephone modem, a cable modem, a T-1, T-2 or T-3 connection, a digital subscriber line or a network card, wireless transceiver, or the like for communicating data to and from other computer devices over the computer network 10. In an embodiment involving a network server, it is preferred that the communications devices used as input/output devices 26 have capacity to handle high bandwidth traffic in order to accommodate communications with a large number of consumer terminals 12.

The memory 28 may be an internal or external large capacity device for storing computer processing instructions, computer-readable data, and the like. The storage capacity of the memory 28 is typically measured in megabytes or gigabytes. Accordingly, the memory 28 may be one or more of the following: a floppy disk in conjunction with a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of and available devices for memory 28 will be apparent.

The memory 28 preferably stores, inter alia, a plurality of programs 29 which may be any one or more of an operating system such as WINDOWS NT by MICROSOFT CORP, and one or more application programs, such as a web hosting program and a database management program of the type manufactured by ORACLE, each of which may be necessary to implement the embodiments of the present invention. The programs 29 preferably also include processing instructions for accomplishing communication of data with consumer terminals 12, marketplace servers 16 and payment processing server 18, as described herein. Accordingly, the programs 29 may include a web hosting application and the like for allowing consumers to submit individual post-sale market data to the third party aggregator server 14, and the like. The web hosting software may include functionality sufficient to read JAVASCRIPT, Hypertext Markup Language (HTML), Extensible Markup Language (XML) and other similar programming languages typically used in conjunction with hardwired or wireless Internet applications. The programs 29 may also use advanced Internet application integration (IAI) methods based on Web services, Simple Object Access Protocol (SOAP), Java Message Services (JMS), or other remote messaging and method invocation middleware techniques, or Agent Control Languages (ACLs). The programs 29 preferably also include a database management program, such as of the type commonly manufactured by ORACLE CORP. to save, retrieve and analyze data received through third party aggregator server 14. The programs 29 may also include other applications, such as VISUAL BASIC, to allow an operator to program specific functions to be performed by the third party aggregator server 14 as described herein. The programs 29 thus cooperate to form a system which operates in the manner described further below.

Figure 3:
FIG. 3 is a schematic diagram of an exemplary individual post-sale market information database stored by the server of FIG. 2.

The memory 28 preferably also stores a plurality of relational, object-oriented or other databases, such as an individual post-sale market data database 300 and the aggregated post-sale market data database 400, examples of which are depicted in FIGS. 3 and 4, respectively. In referring to the databases depicted therein, it is important to note that the first row of the databases includes a field header for each field of the database and the remaining rows each correspond to one record of the database. Fields of data, are represented by each column. Further or fewer fields and records of data may be used. The databases 300, 400 described herein may be configured into any number of relational databases. In addition, configurations other than database formats, including use of XML formats or other standard and/or self-describing formats may be used to store the data maintained in exemplary databases 300 and 400.

Although the embodiment described herein involves components of typical computer network servers, other existing or future technologies which perform similar functions may be employed. One such variation is the blurring of server and enterprise boundaries involved in the use of so-called "Web services" in which functions typically performed by a single server complex operated by a single enterprise may be "distributed" so as to integrate component services provided on remote servers operated by independent enterprises into a cohesive "virtual server" offered by the combined "virtual enterprise." A similar variation is the use of "application service providers" (ASPs) to outsource such services. Also clearly intended is the use of multiple cooperating servers, as well as the use of multiple cooperating client systems noted previously, as well as the use of mobile agent technologies. Variations may include assemblages based on combinations of downloadable programs, plug-ins, applets, aglets, or other distributed components and the use of removable components such as smart cards. Such assemblages may include elements controlled, managed and possessed by any combination of the consumer, the marketplace, the aggregator, or any other party. Thus, for example, elements that might be implemented on consumer terminals 12, might alternatively be provided in an ASP mode by a marketplace server 16. Future embodiments of consumer terminals 12 may be based on a wide spectrum of intelligent devices including smart cards, cell phones, PDAs, wearable computers and sensors, home computers, home network complexes, automotive computers, and the like, and may involve mobile applications that move from device to device, as needed. One example of an assemblage approach would be the linking a consumer's PDA or smart card into an in-store system or kiosk, whether by physical connection, or over a wireless network as the consumer walks down aisles and scans item bar codes (or simply points, using advanced pervasive computing technology). Such assemblages would draw on both the consumer's data resources and those made available by the various other participating parties, which might include proprietary sources of PSMD, pre-sale data such as catalogs, product attributes, pricing and inventory information, decision support system (DSS) tools and analytics, and the like.

Referring now to FIG. 3, an exemplary individual post-sale market data database 300 is provided to receive post-sale market data which is submitted to the third party aggregator server 14 by the plurality consumers through consumer terminals 12 in accordance with the exemplary processes described below with respect to FIGS. 5-7. Although the system described herein may be useful for any item available in the marketplace, the exemplary individual post-sale market data database 300 described herein will be described for an embodiment where the item is an automobile. In such an embodiment, the exemplary individual post-sale market data database 300 may include a consumer identifier field 302, an item type identifier field 304, an item unit identifier field 305, a post-sale market data field 306, a time/date field 308, a trust data field 310, and a next scheduled submission field 312. It is to be understood that these fields may be re-arranged, deleted, or altered in any manner to accommodate other products or services.

The consumer identifier field 302 may contain personal identification information for a consumer. Such personal identification information may include a consumer's name, address, telephone number, e-mail address, other contact information, as well as demographic data of the consumer, such as the age, gender, or income level of the consumer. Alternatively, or additionally, the consumer identifier field 302 may contain a unique identifier pertaining to a particular consumer who submits post-sale market data to the third party aggregator 14, as described previously above. The unique identifier may be any alphabetic, numeric or alpha-numeric, or any binary code which may be generated by the third party aggregator server 14 or selected by the user upon accessing the third party aggregator server 14.

The item type identifier field 304 preferably contains information sufficient to identify a specific item type purchased by the consumer. The product may be identified by make, model, year of manufacture, or the like.

The item unit identifier field 305 preferably contains information sufficient to identify a specific item instance purchased by the consumer. The unit may be identified by serial number or other specific indicia, or by an arbitrary unique code. The product identifier field may, alternatively or in addition, include a transaction identifier to uniquely identify the transaction in which the item was purchased. Use of such identifiers may also enable correlation of multiple occurrences of post-sale market data collected for a given item unit from a single consumer at different times, so that full lifecycle data can be accumulated for the item unit, and can be used to identify and eliminate duplicate entries. To the extent that privacy provisions permit such an identifier to be globally unique, it can also be used to identify duplicate data obtained from multiple aggregation sources.

The post-sale market data field 306 may be used to store the post-sale market data submitted by the consumer for the item. As described previously, the post-sale market data may include a utility rating expressed within a specific scale, such as a scale of 1 to 10 or a scale of −5 to +5. The rating may also be expressed as an index of utility per dollar cost of the item, in order to more appropriately demonstrate consumer utility over a wide range of items having various prices. Another possible scale for post-sale market data involves receiving from the consumer an indication of estimated realized utility on a monetary scale, since that is the most commonly understood scale for comparisons of utility. A preferred approach is by being asked to specify the maximum amount that he or she would consider as a fair price to pay for the item, preferably normalizing out extreme differences of affluence and price-sensitivity as much as possible, such as by the request that the consumer assume that access to funds is not a serious limitation. In addition, the post-sale market data may include operational data for the item rather than a consumer-derived measure of its utility. Various other forms of post-sale market data may be used.

The time/date field 308 may be used to store a date and time at which the submitted post-sale market data was received from the consumer. The time/date field 308 may alternatively be used to store a verifiable timestamp which may accompany the submission of the post-sale market data, in various embodiments. Additional elements in the time/date field 308 may specify the phase in the usage life cycle that the post-sale market data corresponds to, which can be used to obtain detailed analysis of different phases, such as at delivery, after early use, or within a given time or usage interval.

The trust data field 310 is optionally provided to store an indication of need for adjustments based on inferred peculiarities of the consumer's rating behavior, such as whether the consumer is consistently too harsh or too forgiving in evaluating items, as well as other parameters relating to trust. For example, if a consumer consistently submits ratings which are skewed well above or below "average" ratings, that consumer's future ratings may be adjusted to insure a more uniform or normal distribution of ratings for tracked items. Thus, once a consumer has submitted an appropriate number of ratings to determine such behavior, a trust score may be determined and stored in field 310. Additional detail on such adjustments is provided below.

The next scheduled submission field 312 may be used to store an indication of the next date and time by which a consumer must submit further post-sale market data for an item. This data can be used to generate reminders which are then sent to the consumer, or may be used to determine whether the consumer is eligible to receive incentives for participating in the post-sale market data collection process. Such reminders can be triggered based on time intervals or on the occurrence of other events in the usage live-cycle.

Not shown in FIG. 3 is optional collection source identification field, which may be used to identify the specific third party aggregator 14 that collected the data. This may alternatively or in addition provide finer identification of the specific methods applied in collecting the data that might be useful to distinguish in later analysis. This information may be useful in analysis when sets of post-sale market data from multiple such collections sources are aggregated.

Referring now to FIG. 4, therein is depicted an exemplary aggregated post-sale market data database 400 which is provided to store aggregated and summarized post-sale market data for a plurality of items. This might be more strictly referred to as summarized post-sale market data, since individual data may also be aggregated, and an aggregator would preferably maintain aggregations of both individual and summary data. The summarized data is generated from the plurality of individual post-sale market data submitted by consumers to the third party aggregator server 14 as stored in individual post-sale market data database 300. Alternatively, or in addition thereto, the summarized market data may contain aggregated data from one or more other aggregators or collectors. In either event, the aggregated and summarized data may be generated by averaging the ratings submitted by the plurality of consumers, or may be performed by weighing or adjusting the data submitted by each consumer according to their trust data as stored in trust data field 310 prior to averaging. Accordingly, the aggregated post-sale market data database 400 may contain an item type identifier field 402, an item class field 404, a number of submissions field 406 and a summarized post-sale market data field 408.

The information stored in item type identifier field 402 may correspond to that of the item type identifier field 304 of individual post-sale market database 300. The item class field 404 may contain an indication of the class or group of items to which the particular item belongs. For example, item type identifier field 402 may contain an indication of a particular product, such as its make, model, year of manufacture and the like. The item class field 404 may then contain a description of the class of items to which the item belongs, such as "automobile." Accordingly, a particular item class may be attributed to any number of item types which belong to that class. Preferably the item class field would also include an identifier for the defined taxonomy that was used to relate the item type to the item class.

The number of submissions field 406 may contain an indication of the number of consumers who have submitted data for the particular item. This number may be used to average the ratings provided by the plurality of consumers. The summarized post-sale market data field 408 may be used to store the summarized rating or group rating of the particular item type identified in field 402, as determined from the sum of the ratings scores submitted divided by the number of submissions reflected in field 406, and may be used similarly for summarized forms of operational data.

Figure 5:
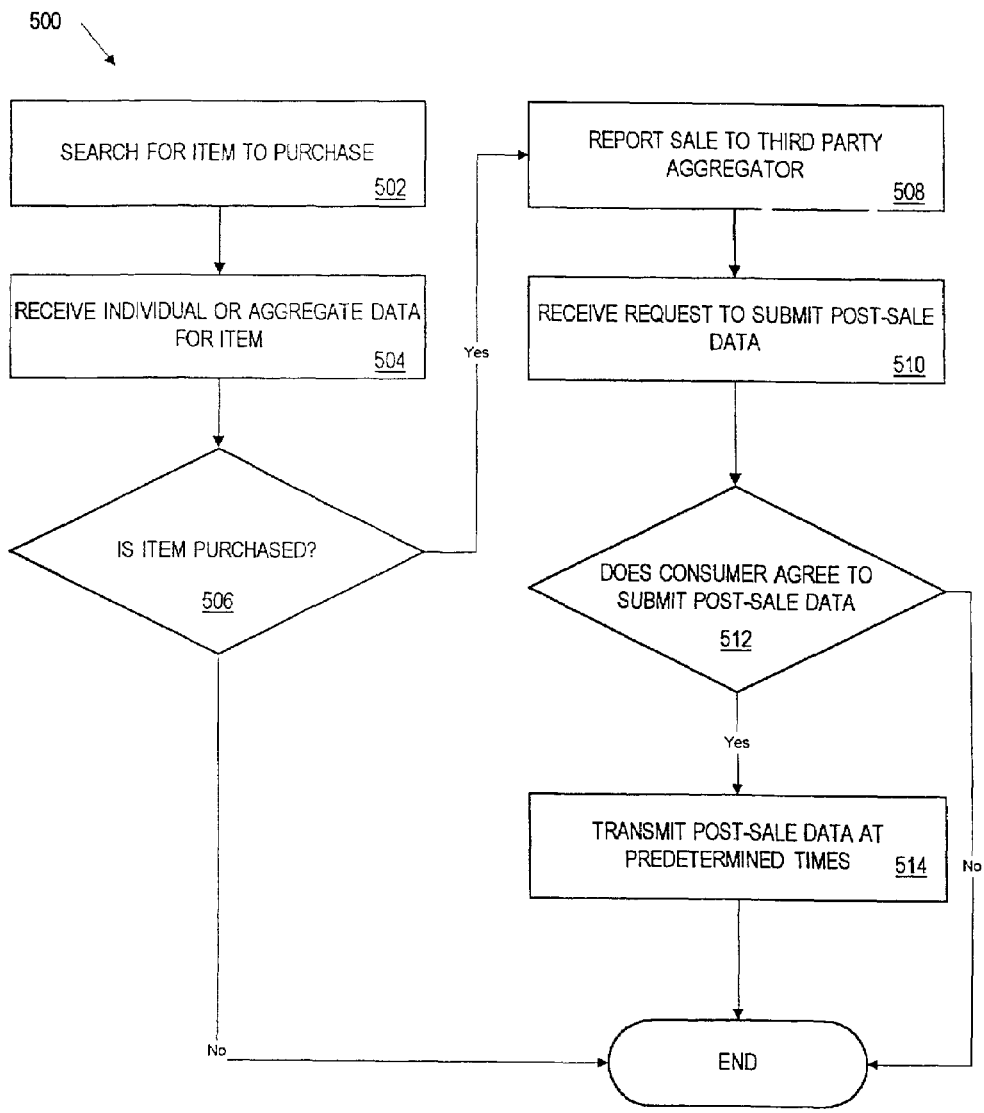
FIG. 5 is a flow chart of an exemplary process, performed by a consumer, for submitting and retrieving post-sale market data according to certain embodiments of the present invention.

Turning now to FIG. 5, therein is depicted an exemplary process 500 by which a consumer may submit and retrieve post-sale market data according to certain embodiments of the present invention. The process begins when a consumer searches for an item to purchase (step 502). This search may take place online or offline. Upon finding one or more items, the consumer may optionally access individual or aggregate data for the items (step 504). In certain embodiments, the provision of direct access to individual submissions of market data at the item level may be provided, with personal identification data excluded or presented in coded form, to permit a flexible variety of analysis and summarization methods as the user may wish without jeopardizing the privacy of the individual consumers submitting such data. To this end, it is contemplated that an anonymous identification code may be assigned by each collector aggregator server system to each consumer submitting market data to that collector. The anonymous identification code may be a distinct, encryption based transform that creates a unique identifier for every collector-submitter pair. That is, for one consumer who submits marketing data to one collector, a unique ID code would be generated. Should that consumer also submit to another collector, a different anonymous ID code would be created. Thus no recipient of data from both collectors could match the two different anonymous IDs and so could not relate any personal data that might be provided from one source to any further data from another source. Note however that an alternative embodiment might provide for assignment of a single anonymous ID to each consumer that could be used with all collectors if no personal data that might be matched were to be forwarded beyond the collector, and that such a universal anonymous ID could be used to match PSMD item data for that one consumer obtained from any of multiple collectors.

Alternative methods may also be adapted from those used in making individual healthcare transaction data available for public analysis without compromising personal data. Such Medicaid payment-related data are collected under Federal mandate through the Health Care Financing Administration, and are released with encrypted or blanked-out physician and patient identifiers, and then only under formal agreements on usage restrictions. (Such data are collected as at-sale transaction data on billable service items by healthcare payers and providers, not by consumers). In general, the methods described here reflect that it is preferable that the data be collected in such a way as to maintain the following properties after aggregation and when passed on further. 1) Anonymity: the data should not be identifiably tied to an individual except in allowed cases. 2) Atomicity: the data need not depend on data about prior transactions. 3) Specificity: the data should relate to a specific, verifiably valid, and non-duplicative transaction (as opposed to summary statistics). 4) Relatability: the data should permit relating data about a single item, and comparing data about similar items. The methods described here reflect that it is sometimes difficult to meet all four objectives, and that in certain circumstances, it may be acceptable and necessary to compromise one or more of them.

Returning to process 500, based on the retrieved data, the consumer may then decide to purchase the item (step 506). If the item is purchased, the process 500 preferably continues to step 508 below. Otherwise, the process 500 ends.

If the consumer purchases the item (whether or not involving the above steps 502-504), the sale may be reported to a third party aggregator server 14 (step 508). It should be readily understood that other triggering events, such as delivery, installation, warranty registration, maintenance of the item, or the like, may be used instead of or in conjunction with the use of the sale as a trigger for soliciting the collection of market data from a consumer. In the case of the sale being the trigger, the reporting of the sale may take place in any of a variety of manners. For example, the consumer may report the sale directly using a consumer terminal 12. Alternatively, a marketplace server 16 may report the sale or a payment processing server 18 which processes the payment for the sale may report the sale to the third party aggregator server 14.

In response to the indicated sale, or in response to some other trigger event, the third party aggregator server 14 may transmit a request to the consumer to participate in the submission of post-sale market data for the item that was sold (step 510). Various incentives may be provided to enlist the consumer, as described previously above. The consumer may then indicate whether he or she wishes to participate (step 512). If the consumer does not participate, the process 500 ends. If however, the consumer does agree, then the consumer may transmit post-sale market data at appropriate times as determined by the third party aggregator 14 (step 514), after which the process 500 ends.

A preferred embodiment would exploit as many such triggers as possible to maximize reach, the number of consumers solicited, and coverage, the number of data collection occurrences throughout the item usage life-cycle. However, it is also desirable that data be collected only from valid consumers of an item, so, depending on the nature of the trigger event, specific validation of purchase or possession may be required. Otherwise false data might be entered by individuals or by suppliers.

The processes described above involve two major groups of interactions with the consumer. One is primarily prior to sale, where the interaction is to access existing post-sale market data as part of a purchase decision support process. The other is primarily post-sale, where the interaction is to solicit the consumer's participation in collection of additional post-sale market data. Each of these two complementary processes can be facilitated separately or in combination by user interaction and support tools which may include remote Web-based services and local intelligent services on the consumers PC or other smart devices and by combinations thereof. Such support facilities would preferably operate in conjunction with related purchasing and asset management support services. Further discussion and examples are detailed below.

Figure 6:
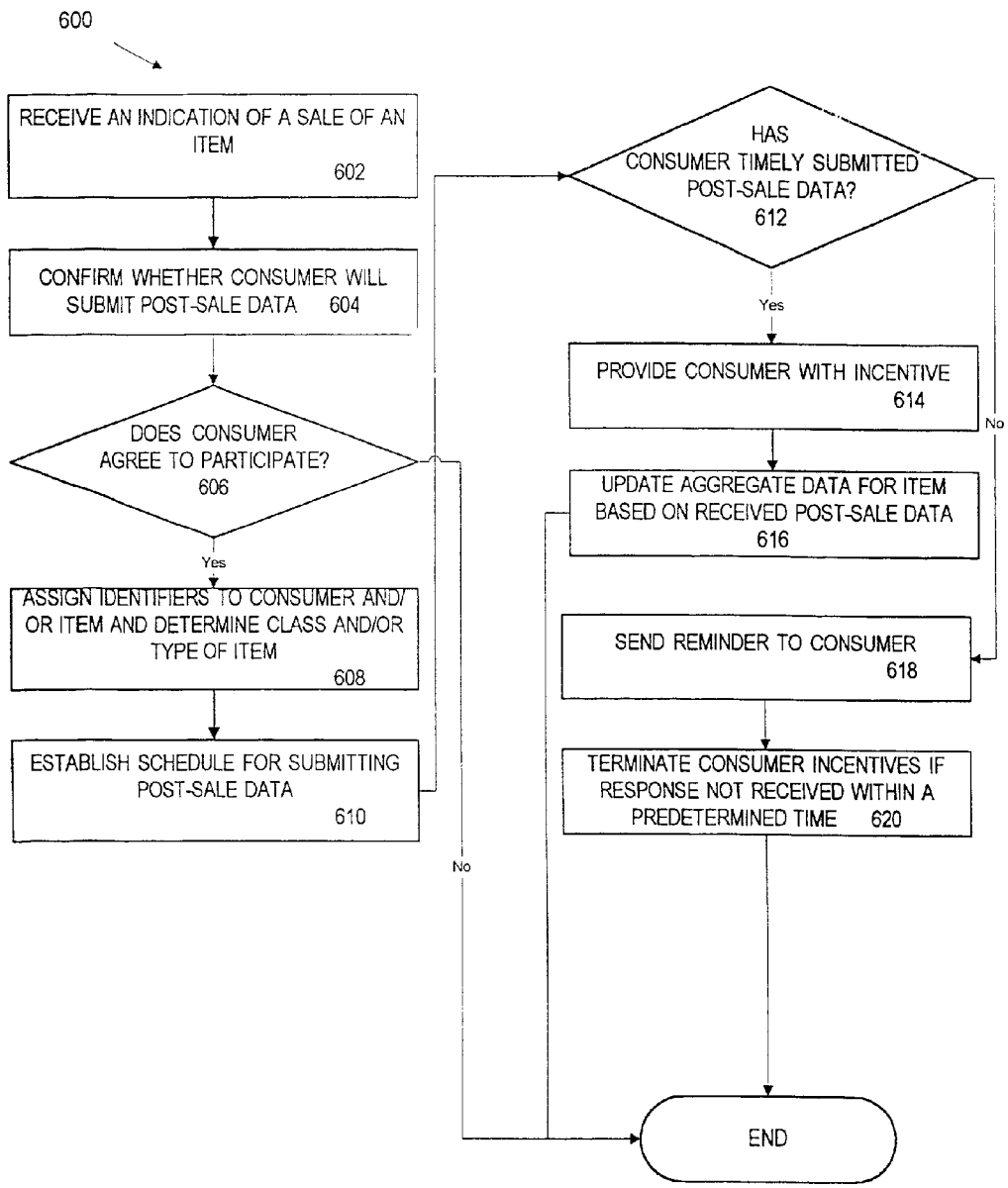
FIG. 6 is a flow chart of an exemplary process, performed by a third party aggregator, for collecting and providing post-sale market data according to certain embodiments of the present invention.

Turning now to FIG. 6, therein is depicted an exemplary process 600 by which the third party aggregator 14 collects and provides post-sale market data according to certain embodiments of the present invention. The process 600 begins when an indication of a sale is received (step 602). The indication may be received in any manner described above.

Next, the third party aggregator server 14 transmits a request to the consumer to participate in the submission of post-sale market data (step 604). Alternatively, such a request may be generated by a software agent running on the consumer terminal 12, when such device is used to make the purchase of the item.

The third party aggregator then determines whether the consumer has chosen to participate (step 606). If the consumer declines, the process 600 ends. Otherwise, the process 600 continues in the following manner.

The third party aggregator server 14 then assigns a unique identifier for tracking the submission of the post-sale market data submitted for the subject item and determines the type and class of items to which the subject item belongs (step 608). The identifier may be assigned to the consumer, to the item, or to the transaction. Alternatively, separate unique identifiers may be provided for each of them. The assigned identifier(s) may then be stored in the appropriate fields of databases 300 and 400.

Next, the third party aggregator 14 optionally determines a schedule for submitting the post-sale market data (step 610). The schedule may be based on the class of items to which the tracked item belongs. For example, an automobile may have a longer lifespan than a laser printer. Thus, different schedules for submitting post-sale market data will be determined for automobiles and laser printers, based on their differing lifespans. Other factors may be used to determine an appropriate schedule for post-sale market data submissions. It is to be understood that the schedule may be expressed in terms of particular events, such as a need for maintenance, or item-specific types of events, including usage milestones, rather than being dependent on a particular point in time. This schedule may be determined by the aggregator, the consumer, or a consumer agent program, or a smart device itself, or by a variety of other such means, individually or in combination.

At the time of the first scheduled submission, the third party aggregator server 14 may determine whether the consumer has submitted the requisite post sale data (step 612). If so, the process 600 continues to step 614 below. Otherwise, the process 600 continues at step 618 discussed further below.

At step 614, the third party aggregator server 14 may optionally provide the consumer any incentive that was offered for the consumer's participation. The third part aggregator may then update the aggregated data based on the consumer's submission (step 616), after which the process 600 ends.

In the case where the consumer fails to provide post-sale market data at the predetermined time, the third party aggregator server 14 may generate a reminder of the scheduled submission and transmit to the same to the consumer (step 618). The reminder may be transmitted in any manner, such as by an e-mail message, an instant message, a voice mail message, a reminder sent via a mailing or the like. If the consumer fails to submit the requisite post-sale market data within a predetermined time, the incentives to the consumer may be terminated (step 620), after which the process 600 ends.

Figure 7:
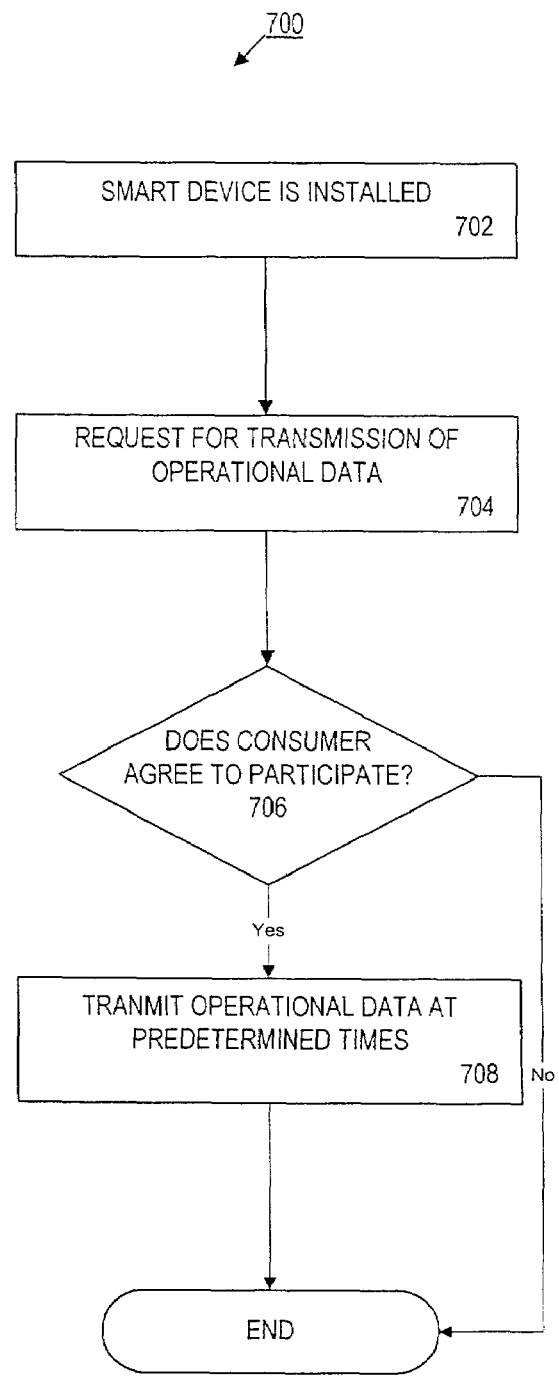
FIG. 7 is a flow chart of an exemplary process, performed by a smart device or the like, for submitting post-sale market data according to certain embodiments of the present invention.

Turning now to FIG. 7, therein is depicted an exemplary process 700 by which a smart device may submit post-sale market data according to certain embodiments of the present invention. As described above, it is readily contemplated that some items purchased may be smart devices which can generate and transmit operational data on their own accord. For example, a smart device may be a common appliances, or other product, which has sufficient processing capabilities, itself, or in cooperation with an associated controller system, to determine its operating status and transmit the same to a central server, such as the third party aggregator server 14. Initially such smart devices may include automobiles, electronic appliances, home environmental systems and other major consumer or industrial products. Over time the range of such smart devices may grow to include almost any product imaginable, such as clothing articles that sense need for cleaning, food products that sense spoilage, provide cooking instructions, and trigger reorder, and the like. In such a case, the device will transmit its own post-sale market data, rather than having the consumer perform this function. Accordingly, such a smart device may perform the process 700 itself, or in cooperation with external computing resources, as follows.

The process 700 begins upon the purchase and installation of a smart device by the purchasing consumer (step 702). The smart device 13 (or a device controller/manager that supports it) may then optionally request that the consumer provide authorization for it to transmit post-sale market data to a third party aggregator server 14 (step 704). If the consumer agrees (step 706), the process 700 continues as follows. Otherwise the process 700 ends. Preferably advanced automation techniques, such as described below, for specifying and negotiating privacy controls on such disclosures would be supported. Upon determining that the consumer agrees, the smart device then transmits operational data at predetermined intervals (step 708), after which the process 700 ends. The process 700 may include support processing to supplement raw data with calculated, derived, and summarized data, producing averages, means, percentiles, exponentially smoothed indexes, and other reduced-format data, and triggering special periodic or threshold-driven snapshots of key parameters. Alternatively part or all of this processing might be done at the initiation of the third-party aggregator server 14, so that it triggers the above steps and polls data from the smart device (or controller), initially on learning of the smart device as a candidate, and later based on a schedule or detection of further trigger events.

Operational events sensed by smart devices may also serve as trigger events for requesting consumer ratings, whether based on usage milestones, or maintenance or failure events. While there is value in collecting both rating and operational data simultaneously on such an event, in the case of failures, a delayed rating that is scheduled to allow a cooling-off interval may be preferable.

In certain embodiments of the present invention, the device may also give the consumer a choice of third party aggregators. Alternatively, third part aggregators may supply device add-on software components that enable this process even if the device manufacturer did not provide for it. This might be done based on proprietary coding specific to the device, or through use of embedded device communications standards such as Universal Plug and Play (UpnP), Jini, Home Audio Video Interoperability (HAVi), and Automotive Multimedia Interface Collaboration (AMI-C). Such add-ons may be installed at the initiation of the consumer directly from an online source, or by a third party, such as a maintenance service.

Building on the above-described elements of the invention, a number of further aspects and extensions are given fuller description below.

Taking a broad perspective, it is useful to view the invention as exploitable to be the heart of a broad program of obtaining and applying feedback on the post-sale characteristics of items in order to enhance market behavior and decision-making. Post-sale market data is preferably obtained as fully as is practical, with maximum "reach" to all consumers who have useful experience, and with maximum "coverage" of all periods of use during the item usage life-cycle. This data is then applied as widely as possible to the full range of purchase decision processes that they can support, as well as to related marketing processes. When fully realized, this broad program may involve a wide variety of participants that play complementary roles in facilitating the collection, processing, aggregation, distribution, access, analysis, and use of post-sale market data. Multiple players active in one or more of these aspects of the process may complete and/or collaborate to complement and add value to one another's offerings in a rich market ecology.

Figure 8:
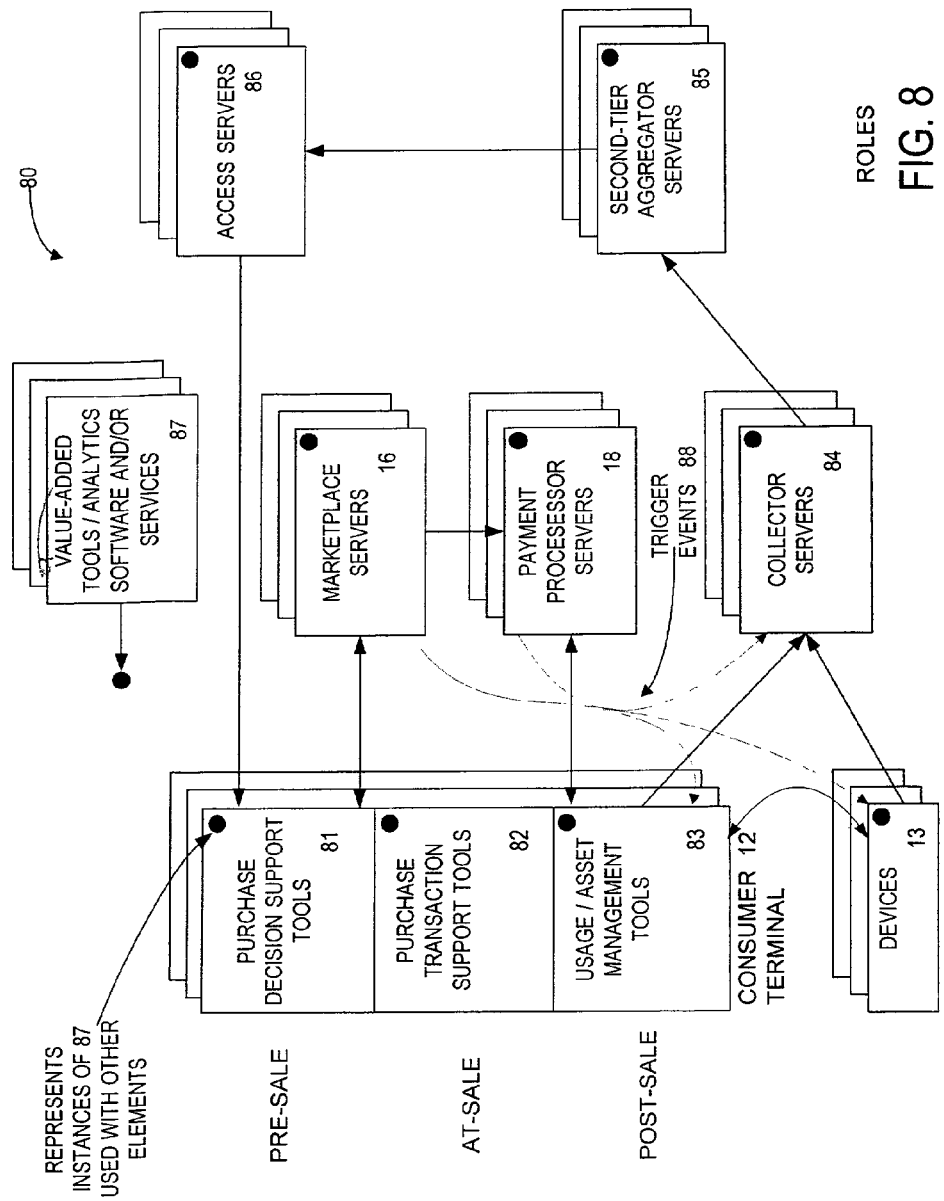
FIG. 8 is a block diagram of an exemplary computer network expanding upon elements of FIG. 1 according to certain embodiments of the present invention having further differentiation of roles.

FIG. 8 shows a simplified representation of key roles in a PSMD services market ecology. A consumer uses one or more of a set of consumer tools, including components supporting the major stages or epochs of the item purchase/usage life cycle, a purchase decision support tool 81, a purchase transaction support tool 82, and a usage/asset management tool 83, which may each be independent or integrated with one another or with other support tools. Trigger events 88, may be obtained from marketplace servers 16, payment processor servers 18, and other sources. The consumer submits post-sale item data to collector server 84, a process that is preferably facilitated by usage/asset management tool 83. Similarly, items themselves, in the form of smart devices 13 may optionally also submit item data, and may interoperate with usage/asset management tool 83. Collector servers 84, may in turn provide the PSMD to second-tier aggregator servers 85, which in turn provide the PSMD to access servers 86, which in turn provide consumer access to the PSMD, preferably facilitated by purchase decision support tools 81. Value-added tools/analytics software and/or services 87 may also be used to add function to the other elements, particularly the purchase decision support tools 81.

A key aspect of this ecology, as enabled by the invention is the ability to structure the processes described here to be applied by multiple tiers of post-sale market data service providers to enable a range of capabilities not readily achievable by any one player alone.

One tier may function in the role of collector servers 84 that operate third party aggregator servers 14 as the first stage in collecting post-sale market data from consumers. Such collector services can specialize in building relationships with various populations of consumers and providing them with the necessary tools and value propositions, which may include tools from value added providers 87 and various incentive programs, to maximize participation. While any single collector service may have limitations of reach and coverage due to limited resources, limited ingenuity, and inability to be all things to all people, a variety of such services can complement one another and compete for reach and coverage.

A second level role is that of second-tier aggregators 85 that operate third party aggregator servers 14 at a wholesale intermediary level in which they obtain post-sale market data from one or more collectors. These second-tier aggregators can specialize in the task of managing large sets of post-sale market data, and in the normalization and conversion processing needed to allow sets of PSMD from different collectors that may use different methods and utility scales to be meaningfully aggregated and related to one another so that the item data can be used in combination, to provide a consolidated view of the market for an item. It is with such consolidation of sources that maximum reach and coverage can be obtained to enable access to PSMD that represents a major portion of the total consumer experience base for a type of items. Thus such second-tier aggregation can greatly increase the value of the PSMD. Players in this role may distinguish themselves by scale, scope, pricing, efficiency, features, and the like. The existence of this role is enabled by the methods of the kind described here for aggregating, converting, and normalizing sets of item-level PSMD from multiple collector sources that may use different collection methods to form a combined superset collection of data representing all of the consumers in the sets from all of the collectors.

Another key role is that of access servers 86 that can specialize in the task of providing flexible and selective access to PSMD by offering services that facilitate data mining, searching, filtering, alerting, and analysis. This may include innovative technological methods as well as innovative pricing and marketing approaches tuned to the needs of specific markets for PSMD, including different item categories and different consumer categories such as budget, affluent, commercial, industrial supply, or simple versus sophisticated, or high-value items versus low value items. and the like. This role is that of access provider, but it is also that of distributor or re-distributor, or reseller, and thus can also be thought of as a third or higher tier aggregator. Again, role specialization and competition among players in this role is desirable to enable the wide range of service offerings and value propositions needed to effectively reach and serve all potential markets for access to PSMD. Again, the existence of this role is enabled by the methods of the kind described here for aggregating, converting, and normalizing sets of item-level PSMD from multiple collector sources that may use different collection methods to form a combined superset collection of data representing all of the consumers in the sets from all of the included collectors.

It should be noted that the various aggregator roles described here may have some parallel to the role of third-party "infomediary" services that collect information profiles about consumers in order to act as intermediaries for the consumer, such as to aid in searching for items and merchants, and in filtering or targeting marketing offers. Such infomediaries might serve as aggregators of PSMD, as well.

Providers of value-added tools/analytics software and/or services 87 represent another important specialty role. Much of the art of drawing useful conclusions from PSMD is in the mathematical and statistical data mining techniques used to select, weight, and interpret the raw data from individual consumers. Companies may specialize and innovate in this domain, and make tools available for use with PSMD obtained from any of a range of sources. Similarly, the analytic processing needed to meaningfully combine PSMD from different collection sources may also be done with a variety of methods for converting and normalizing these disparate sets of consumer data to create meaningful supersets. These tools may operate in conjunction with any of the varieties of third party aggregators 14, and with purchase decision support tools 81 to add value to the process, and to achieve economies of development and deployment that might not be achievable for any one such third party aggregator or purchase decision support tool alone. These tools can be implemented in any of a variety of forms, including programs, plug-ins, applets, or other components, and Web or ASP services. Again, the existence of this role is enabled by the methods of the kind described here for aggregating, converting, and normalizing sets of item-level PSMD, which make it desirable for third parties to develop further enhancements to the analytic methods that support those processes, by providing rich markets for such enhanced methods among the various PSMD users and intermediary players, across the spectrum of collector services.

Throughout this PSMD market ecology, the richness of sources and markets and players reinforce one another to add value at all levels. And all but the most basic levels depend on the methods of the kind described here for aggregating, converting, and normalizing sets of item-level PSMD from multiple collector sources that may use different collection methods, including different PSMD scales and formats, to form a combined superset collection of data representing all of the consumers in the sets from all of the collectors. It should also be understood that the above description of roles is idealized to emphasize roles that can be differentiated and distinct, but that in a real embodiment it is likely that individual players may take on multiple roles, such as collector, aggregator, distributor, and analytics provider for some or all market segments, just as is common in any complex market ecology. Not shown in FIG. 8 is the expectation that other players such as producers and suppliers might also participate in various roles as additional users of PSMD (as a source of data about their products), and as facilitators of the data flow process or as providers of value-added services. Also not shown is the expectation that marketplace servers 16, and payment processor severs 18 may also be users of PSMD, whether for their own market research purposes, or to pass on as a services to their consumer clients, and that other players such a publishers will also obtain such data as a service to others. Other cases of role blending may include marketplace servers 16 or payment processors 18 taking on roles of third party aggregators 14. This might be particularly desirable as the field emerges, in that such established players can build on their existing relationship with consumers to offer this additional class of services to mutual benefit.

Turning to the consumer, it can be seen that interaction with PSMD preferably occurs throughout the item purchase/use life-cycle, and that automated aids for such interaction are preferably powerful and well integrated with other related activities at the various stages of the life-cycle. These can be thought of broadly as productivity aids and decision support systems (DSS), and may include components that are integrated with other tools on the consumers PC, PDA, or other intelligent devices, as well as on Web sites or Web services used by the consumer that may be provided by merchants, marketplaces, payment services, shopping services, product support services, manufacturer support services, and the like. Advanced versions of such services which have relatively high levels of intelligence or autonomy or distribution are often referred to as agents or bots (from robots). Such approaches address the phases of need recognition, information search, and evaluation, and are described broadly in Agents that Buy and Sell by Maes, et. al., and in Web-based Customer Decision Support Systems by O'Keefe and McEachem. Such tools will evolve and deepen in function to serve the following goals: maximizing the availability of PSMD by facilitating and incentivizing consumer participation, maximizing the value of PSMD throughout the value chain by ultimately maximizing the consumer's ability to use the PSMD to make good purchasing decisions, and maximizing the overall ability of the consumer to manage all aspects of selecting, buying and using items.

Shopping bots are already emerging in a basic Web offering, such as MySimon, that can be viewed in part as a specialized search for current prices for a product to be purchased to find a best price. Additional shopping bot functions may include pre-sale product feature comparisons and preference analysis, such as Active Research and the methods of U.S.

Pat. No. 5,983,220 (Schmitt). The addition of effective tools for obtaining, understanding, and drawing conclusions from PSMD would add significantly to the value of such purchasing decision support tools. While some very primitive and limited such capabilities have been offered by the ratings services cited earlier (for ratings only; not at all for operational data such as usage and maintenance information), those have been too limited in reach, coverage, and validity to be of much value. In addition, they have offered the consumer no flexibility or control over how to aggregate and analyze the raw data in ways most appropriate to the specific decision-making task. Today a primitive DSS might present consumer ratings on a loosely defined 1-5 point scale, from some very small (often as few as 1 or 2 to 5 or 10; rarely much more) sample of self-selected consumers, along with anecdotal prose reviews by those few consumers.

With the service described here the user might be able to obtain access to individual PSMD (both ratings and operational data) aggregated from multiple sources to provide experience from thousands to millions of consumers, representing a substantial portion of all consumers of the item. With a mixture of preset preferences and task-specific selections, the consumer could select what data collection sources to use, what available conversion and normalization rules to apply, and what data mining and analytic rules to use to weight, adjust, and interpret the results. Such selections (alone or in combination) may be offered by the access server 86, the provider of the purchase decision support tools 81, or independent vendors of value-added tools/analytics software and/or servers 87 that may operate with either of the first two, either directly or through various other players the consumer does business with. For low value consumer products, default selections would be common, and users would simply select an offering that generally performed to their satisfaction. For high value consumer products (such as cars), and especially for business or industrial products, more variation, sophistication, and care in selecting the right data sources and processing and analytic tools for the specific task would be invested to make the right decision. For purchasers of key industrial supply chain components that are essential determinants of the quality and cost of a manufactured product (such as selecting a component circuit for a high-volume electronic product), very intensive and sophisticated collection and analysis would be warranted, with a high degree of control over the data sources, methods, and tools applied.

Use of operational data represents an additional source of information for purchasers that can also be integrated into the shopping bot. This can be used as additional and supplementary data in multi-attribute preference analysis. Typically such analysis and DSS tools rely on pre-sale specifications provided by manufacturers, which may or may not apply to realistic situations, and may not be achieved because of quality or other factors. Post-sale operational data can avoid those limitations. A more advanced example of the use of such data might be in a simulator for a new car purchaser. Such a simulator might gather information from the consumer on his driving habits and preferences, and then select operational experience data for a proposed purchase from a matching subset of consumers in order to extrapolate how that car would be expected to behave under the conditions specified. Where data is limited because of a new car model change, this might weight both data on the current model, and on prior models expected to behave similarly. Consumers with different personal characteristics would thus obtain a simulation of prospective usage that corresponds to their characteristics and is based on a review of the actual operational data relevant to those characteristics.

Operational data from the purchaser's own autos could be used to automatically create a driver profile, to be used instead of or in addition to the purchaser's self-description. Such simulations may address handling and driving performance as well as maintenance and reliability, based on actual data that characterize the consumer.

This is just one example of a broader opportunity to use a consumer's own PSMD to characterize the consumers needs and preferences, and to then use that information as a filter for assessing PSMD from others on prospective purchases. The methods described here provide a way to collect data to enable collaborative filtering techniques for proposing new products to be considered based on preferences of other consumers with similar rating profiles, as well as to enable selective filtering of PSMD to give preference to the experience of a subset of consumers with similar profiles. Again, it is the ability to gain access to the individual PSMD data (whether directly or through intermediaries that protect private data) that enables such custom-filtered applications of PSMD. Related to this is the desire to develop special categories of data about consumers that could be useful in analysis, such as data that qualifies the authority of a consumer as rater of a given type or class of item. This could include demographic and psychographic data, but can also include indirect behavioral data that can be sensed from the consumer's activity in the various tools described here, including possession of many items in related categories, trust data that is specific to the item class, as well as other similar data obtainable from other sources.

Next in the life-cycle, integration of the PSMD elements described here with shopping bot tools at time of purchase would be particularly aimed at identifying at-sale trigger events and soliciting the consumer's participation in PSMD collection. Such integration would preferably draw on all available points of contact, including the consumer's shopping bot itself, the merchant/marketplace/supplier and payment processors involved in the transaction, specialized incentive services, and possibly manufacturers, purchasing DSS services, delivery services, installation services, warranty services, and the like. Functions would include identification of trigger events, collection of relevant data, possible relay to one or more collection and/or incentive services, determination of what incentive programs might be relevant, whether the consumer already participates or not, and presentation of one or more offers.

Moving to the post-sale epoch of the life-cycle, the core of integration is the continuing interaction of the consumer with the PSMD collection processes. This can be done directly by manual action, and by smart devices directly. Preferably, this can be integrated with other post-sale support functions, in a broad embodiment of the usage/asset management tools 83.

Such tools can be thought of as roughly corresponding to a different but related embodiment of tools for asset and operational management that have developed for managing complex collections of industrial assets such as telecommunications networks and enterprise information technology infrastructures. Asset management systems, such as those from PEREGRINE SYSTEMS, maintain inventories of associated items, such as computers or network components, for administrative asset management purposes. Operational network management systems support sets of system or network elements which are linked into cooperative networks, and collect selected operational data on the status of such elements to assist network operation and management support staff in identifying and resolving problems in the operation of the network. Network management systems for telecommunications carriers are described by ITU standards for the Telecommunication Management Network, and those for enterprise networks are represented by COMPUTER ASSOCIATES Unicenter and similar it products from HP and IBM/TIVOLI. Such data may be routine data, as well as alerts to failures or anomalies. Such systems and their data are used within organizations that own or maintain the elements, or have a responsibility for the operation, or other shared interest in the network, including suppliers and service providers (and sometimes insurers and regulatory bodies) who assist in that responsibility, but these systems have no provision for sharing the data externally—such data is considered private and proprietary. A preferred embodiment of the invention would enable external release of such data, preferably on an automated or semi-automated basis—under defined, controlled, and protected conditions, and with appropriate incentives and human oversight, to encourage release of data previously held as proprietary—to PSMD collector services for use by others, particularly other consumers of similar items. Such data would preferably include all items controlled by an organization, regardless of whether they formed elements of a system that were interdependent or interconnected, or viewed as a collection under common management, such as a vehicle fleet, or merely consisted of a set of independent and unrelated elements.

Such industrial asset management tools are very complex and costly, being designed to meet the special needs of systems and networks containing thousands of interconnected elements performing mission-critical real-time tasks in which failures are extremely costly and difficult to locate, and are intended for intensive use by professional network management and administrative specialists supported by information technology staff and for use within large-scale systems infrastructures. Tools to meet the very different needs of individual consumers must have a very different value proposition, approach, and feature set that is targeted to consumer productivity and to personal or family home computing environments. They must be simple, easy to learn, and inexpensive, and must integrate with related services, software, and data resources suited to individual consumers. A preferred embodiment would integrate tools to assist in PSMD data collection as described above with broader usage/asset management tools.

With regard to PSMD, such a tool would serve as a ratings bot that would keep track of time and usage, and remind consumers when ratings (or operational data) should be submitted, for all the consumer's items. It would also keep track of all the consumer's incentives programs so the consumer could clearly see the motivation to participate, and not have to expend effort to ensure that all credits are accrued. In this regard it would be similar to bots that manage multiple airline mileage programs for consumers, and might integrate with such tools. Preferably, it would similarly integrate with credit card incentive programs, Web points programs, and the like. Further productivity support may include intelligence to minimize the burden on the consumer as the number and frequency of data requests grows. These would include facilities to list, filter, and prioritize scheduled rating requests based on consumer preferences, such as to identify requests that were not worth attending to due to low incentive value. Enhancements might also track prior ratings for this and other items, present a history, infer and suggest a likely rating for the consumer to accept or override, and provide other autocomplete services to ease data entry. Such history can help consumers avoid inconsistency in their rating behavior. Another valuable feature might be to schedule follow-up or revised ratings designed to obtain re-evaluations of prior ratings that may be tied to later events or new information, or to simply allow for hindsight, particularly in cases of extreme ratings, or ratings that may be early in the usage life-cycle, or suspect for other reasons. In general, the use of a single such tool that is well known, consistent, and always at hand, by a consumer for all rating tasks, can enhance his familiarity with the rating scales and process, and maximize rating quality and compliance while minimizing administrative burden.

Preferably, such a tool would broadly offer a productivity aid for managing all of a person's assets on a consistent basis, keeping track of warranties and maintenance needed and done and other ongoing support tasks, service entitlements, rebates, and the like, and would not be limited to any item vendor or marketplace or class of items. It could support and aid in all of the following: delivery/install events, periodic rating or operational data entry events and incentives, usage data events including milestone-related load history and performance history and threshold events, maintenance data events, including scheduled and unscheduled (failure) events, return/repair events, and end of use events, including reasons, disposition, final ratings, final operational data and lifetime performance, load, and maintenance data. It could also integrate with other relevant services, such as for maintenance, such as an auto dealer service system, and for sale or disposal of used items. Such an integrated embodiment also adds important features and controls related to the release of PSMD even in those industrial segments where different specialized kinds of operational and asset management systems exist.

With the future proliferation of smart appliances and other devices, the need for such a usage/asset management tool becomes even greater. Consumers will possess an ever-larger collection of smart devices, each with its own control component that resides on the device or may be distributed to the consumer's PC or to Web sites, or some combination. Each will have a user interface, with control commands, status information reports and history, maintenance information, and the like. There is recognition of the need to integrate the operational control functions for specific groups of devices that are expected to interoperate to perform a task, such as for entertainment devices that might be linked into a system, or for common control of home environmental systems such as for heat and lighting, that has led to emerging embedded device communications and control standards as referenced above. However, there remains need for a broader overall administrative asset management tool for all devices a consumer may own, that serves needs for administrative support rather than operational control. Such a master administrative system can serve as an umbrella control environment for managing administration of all devices, and for common support tasks related to coordinating their various individual control systems, such as alerting the user to failures and anomalies and managing software versions and updates, including awareness of whether fees for maintenance and update services are paid. The system thus preferably includes support for groupings of related or connected devices into systems, and for interoperation with the system-specific control systems, and could optionally extend to include support for basic operational controls as well, either directly or through the system-specific control systems, enabling it to serve as a master controller. Similarly, such a system could support management of entitlements for content services, including subscriptions and pay-per-view/use, software services, warranties, and repair services, and could integrate with financial support services for payment management. Preferably data would be obtained automatically from available sources, but manual or semi-automated inputs by consumers or service providers may also be used. Portions of such systems might be offered to consumers as collaborative, value-added services by interested parties such item manufacturers, merchants, marketplaces, or service providers. Preferably any such externally controlled data and software components would be operable as subordinate to a broader system that was proprietary to the consumer and accessible to others only on such terms and with such limits of scope and use as the consumer agrees to (preferably using methods for negotiated release of information as described below).

The collection of operational data as PSMD might be just one component function of such a usage/asset management facility. It should be understood further, that such a facility would be of considerable value to consumers totally apart from the aspect of its use that relates to external submission of PSMD.

To the extent that data on software services, warranties, repair services and other support services are maintained in such a consumer facility, such data may contribute to the determination of post-sale market data. Such data might indicate the kind, number, and frequency of problem incidents that occur, including "soft" user problems that may not be identified as problems at the device level, how long they are outstanding before resolved, how well they are resolved, and such other metrics relating to items and their use and support as may be derivable from the consumer's automated support systems.

Linkage of the asset management tools to the shopping tools may add further desirable features, such as ability to relate prospective purchases to existing possessions, such as for compatibility of a new entertainment device with existing components, simulation of the new unit working in the home environment, and to integrate financial management on a full life-cycle cost basis that includes all costs of ownership for all assets.

Some further discussion of examples of data collection and processing may be useful to clarify possible embodiments and extensions related to data handling. Appendix A summarizes the major data elements that might be collected for a combined embodiment of rating and operational data. Sample #1 is for the case of an auto, and Sample #2 for the case of a laser printer. In this example, the basic information is independent of the item type, and the rating and operational data varies with item type. Other kinds of data may apply to radically different item types such as services, or information products. For example, operational data on a Web page might include clickstream data, including prior and next click and time spent viewing a page or item.

What is not clearly shown in these samples is the attention that might be given in a preferable embodiment to structure a taxonomy of types and classes that leads to an orderly set of variations in the details of the data such that many of the higher-level data elements would be defined in a consistent fashion so that similar types or classes would have similar elements, and even dissimilar types or classes would share some basic elements. Item class hierarchies may be defined, such as mid-size sport sedan, sedan, automobile, motor vehicle, and major product, with gradations of variation in the data elements corresponding to the hierarchy, so as to simplify handling, and to allow meaningful aggregation of data in higher level groups, such as all Honda vehicles compared to all Mercedes vehicles. Such hierarchies would preferably be defined using XML and emerging tools for managing, converting, matching, and reconciling XML schema as used for other forms of data interchange and interpretation, such as IBM's Visual XML Transformation Tool.

Attention to consumer privacy is clearly a key requirement, and becomes particularly important with the methods described here for enabling PSMD users and multiple players in the PSMD collection-distribution value chain to access the individual item data. This also applies in different form to consumers within an enterprise, where it is proprietary enterprise data being released. As noted above, and shown in the samples, care would be taken to promulgate only anonymous identifiers, not identifiable consumer identification or demographic details. Apart from the simple method of generating anonymous IDs given above, a variety of more powerful methods of managing such sensitive data are in development for other similar cases where personal data might be divulged or not, depending on the desired use and the commitments made to maintain privacy.

One prominent and promising such effort that may preferably be adapted and extended for use in with PSMD collection is the work of the Platform for Privacy Preferences (P3P) Initiative of the World-Wide Web Consortium (W3C). As described by the P3P, "At its most basic level, P3P is a standardized set of multiple-choice questions, covering all the major aspects of a Web site's privacy policies. Taken together, they present a clear snapshot of how a site handles personal information about its users. P3P-enabled Web sites make this information available in a standard, machine-readable format. P3P enabled browsers can "read" this snapshot automatically and compare it to the consumer's own set of privacy preferences. P3P enhances user control by putting privacy policies where users can find them, in a form users can understand, and, most importantly, enables users to act on what they see." A similar agreement could be negotiated between consumers and collectors, and could govern the rights of collectors to make such data available to other parties, such as second-tier aggregators or end users. Clearly it is preferable for consumers to be faily open in divulging some relevant data to collector services with satisfactory trust levels, but to be more restrictive about which data can be passed on to other aggregators or users. At the same time, given suitable controls and incentives, some such broader disclosures may be acceptable, such as to the marketplace or manufacturer from whom the item was obtained, or to selected groups of consumers, such as fellow members of a professional association.

Preferably this mechanism for controlled, negotiated disclosure would be extended to operate from smart devices to govern the automated (or semi-automated) release of operational data. This would involve a distributed mechanism for defining policies, rules, and priveleges that support simple management control by the consumer, such as from within the asset management system, but which also enabled independent action by smart devices within the prescribed constraints, and which obtained data on such negotiated releases back from the devices to allow effective approval and/or monitoring of all such activity.

Preferably protocols now used in network management applications, such as Simple Network Management Protocol (SNMP), may be applied and extended for the proposed use. SNMP defines a protocol for communication between network objects supported by intelligent components called "agents" that can communicate with managing systems or "managers," regarding database structures called Management Information Bases (MIBs). Version 3 of SNMP adds basic security and access control features that may be extended to support controlled disclosure of PSMD operational data (as well as ratings) as described, based on a View-based Access Control Model (VACM) that can be used to specify external "user" recipients and restrict them (for example) to read-only access to specified sets of object instances and specified types of data ("MIB views" and "MIB contexts"). The extensions would add higher-level controls to negotiate whether an external collector party should be permitted access and on what basis, as described above, and then set the VBAC accordingly. While such SNMP-based connections may allow external collectors to interact directly with the smart devices, it may be preferable to have a managing system mediate these interactions to provide greater control and reduce the requirements on the individual object devices.

A further development in this area that may be useful in facilitating the higher level functions of negotiated disclosure described here, in cooperation with the P3P and SNMP protocols, is the proposed eXtensible Name Service (XNS) protocol and infrastructure. Where P3P currently focuses on communicating privacy policies, XNS is intended to support automatic and semi-automatic negotiation of privacy contracts involving legally binding registration agreements recorded with an XNS "agency," much as payment agreements are made with a payment processor, and to use P3P in support of that task. It is too soon to tell if these proposed standards will gain and sustain acceptance, but the methods they provide are representative of those seen as preferable. Other methods may also be applied, and the use of whatever relevant standards gain acceptance would be desirable to achieve the wide applicability that is intended.

The discussion of PSMD has referred primarily to such data as being submitted by a consumer either directly or through a smart device used by the consumer or through a software agent operating on behalf of the consumer. Some examples of variant methods of PSMD sourcing are described here. One is that additional data usable as PSMD may be obtainable from other parties (most notably in the case of operating data), such as from maintenance or service providers or suppliers of parts or after-market accessories or other items typically used in conjunction with an item, relatable to that individual item (or at least the item class), and indicative of its usage, maintenance, or operational status. Thus in some cases post-sale market data for an item may be derivable from corresponding at-sale (transaction) market data for related, supplementary items, and this data may be obtainable without the approval of the consumer (to the extent that privacy restrictions do not prevent that). Another example is the case where PSMD is obtained collaboratively with the consumer, such as by an auto dealer who provides service for the consumer using dealer service support systems that are cooperative with the onboard computer systems (and where such data may or may not be shared with the consumer). Preferably wider release of such data as PSMD should be done only with the permission of the consumer, using adaptations of the control methods described above to work with this distributed, collaborative system, but less consumer-oriented policy approaches may be taken. In any of such cases it may be desirable that the methods described here for processing, aggregation, distribution, access, analysis, and use be applied to such data as well, treating it as an additional source of PSMD to the extent useful and permissible (and with recognition of its special status as appropriate).

Analysis of PSMD on utility involves consideration of the following: the metrics of utility, meaning what aspects of utility are considered, including total and component aspects, the scales on which the metrics are specified, whether linear and bounded or not, and the distributions of ratings, both for a single consumer and for multiple consumers, which may typically be uniform or normal, or tend to follow some other statistical distribution. Conversion and normalization may relate to all of those aspects. Some detail on these issues is provided in Appendix B, and key points are included here.

Much of this approach draws on the view that ratings (and operational data) are estimators of an underlying utility that relates to item quality, and thus have similarities to measurements of quality as is addressed by statistical quality control methods. It is well established that statistical distributions are useful for analyzing variations in quality, and that the normal distribution as well as various related distributions are particularly useful. When estimated on an unbounded, dollar-denominated utility scale as suggested above, the ratings given by a population may be expected to show characteristics of a normal distribution, reflecting a central tendency about an established value, with a tailing of ratings to either extreme. Such an example of ratings for a Honda car is shown in FIG. 9. As is apparent in the standard format 904, such dollar-denominated values can be mapped to a bounded uniform scale of utilities that range from 0 to 1.0 and correspond to the cumulative distribution function for a given set of ratings. Similarly, more common bounded rating scales may preferably be structured to obtain ratings that approximate a uniform distribution. Such mappings from one scale to another can be defined in terms of a ratings distribution function that is analogous to a probability distribution function. This can be the basis for a method to define a variety of transformation and normalization rules that can be used for purposes of aggregating PSMD.

Building on this approach, one important element in applying PSMD is in the probable need for adjustments based on recognized peculiarities of the consumer's rating behavior, such as whether the consumer is consistently too harsh or too forgiving in evaluating items, as well as other parameters relating to trust and validity. Once a consumer has submitted an appropriate number of ratings to determine such behavior relative to the known pattern of ratings by others for the same respective item types, a trust analysis can be done, and suitable adjustments made to the data. This can be done locally and with complete privacy by a consumer's own ratings bot, as a component of usage/asset management tools 83, or by a collector server 84.

As described in Appendix B, and shown in FIG. 9, this adjustment process involves the identification of a source distribution for the rater 902, and a target distribution for the aggregate of a population of raters 904. One of many possible methods for this is based on the fact that it is possible to characterize each of the source and target distributions in terms of four key parameters that have well known statistical meaning: 1) average or mean, 2) standard deviation, the variability or second moment about the mean, 3) skewness, the relation of mode to mean, or third moment about the mean, and 4) kurtosis, the peakedness or fourth moment about the mean. Standard curve fitting techniques based on these parameters can enable the specification of source and target distribution functions, which can then be used to define a normalization mapping 906 based on the cumulative probability to convert from one distribution to another. This effectively determines a ratings fractile or percentile score, and draws on the fact that such fractiles or percentiles are inherently normalized to a population, independent of what original scale was used. Other methods for developing broadly applicable normalization functions using statistical methods will be recognized by practitioners skilled in the art. In any case, the methods would seek to use appropriate weightings to adjust for non-uniformities that could be inferred to be peculiar to the rater as an individual and not meaningfully reflective of the rater's experience of the item itself for purposes of inferring how another consumer might experience the same item (but not to normalize out the underlying patterns relating to the item itself).

Note that this discussion frequently refers to ratings, on the basis that ratings are particularly subjective and needful of adjustment, but that these methods may be usefully applied to adjustment of operational data as well.

Other adjustments to ratings or operational data obtained from a given consumer might be made to address other variations from "normal." An example is the analyses of medical outcomes based on the Medicaid transaction data (described above) that are made by value-added analytical services such as HEALTHGRADES that apply adjustments intended to compensate for variations in demographic and clinical risk factors. Optional alternatives in analyses using the methods described might be that after determining the effects of such factors, the user could choose whether to adjust to normalize such variations out, or to reverse-adjust the data to match the demographic and other characteristics corresponding to the user's desired case. Thus for example, a car buyer who does 40,000 miles per year of highway driving might view detail and summary data adjusted to an average driver (12,000 miles of mixed driving), or a subset of filtered data drawn only from similar drivers, or custom-analyzed data that took the experience of all drivers, but adjusted them to estimate what they "would have been" under the target conditions. For some uses, it may be desirable to adjust the data for both Ferraris and Civics to a single norm, but for a prospective Ferrari purchaser, that might not be the most useful analysis.

A similarly important issue in advanced, multi-tier aggregation of PSMD from different collector servers 84 to second tier aggregator servers 85 is the probable need for a second level of adjustment to convert data to a common scale and format and to normalize or adjust for any artifacts of rating pattern due to different collection methods, and for differences in the underlying populations. Each collection source of PSMD for an item type can be characterized by the range and distribution of its data values. Using the methods similar to those described above for single collections, a transformation function or method can be defined for each source to convert and normalize that set of PSMD to a common target range and distribution. That target may be either a defined standard or an arbitrary one, including the use of any one collection as a base that all others are converted to. Using these methods the PSMD from a set of multiple collection servers 84 can be combined into a single meaningful collection offered by a second-tier aggregator server 85.

Preferably selectivity could be provided to allow users to control such aggregation conversions to meet their own analysis needs, depending on the importance of the decision and the sophistication of the user. Such selectivity may be provided through options offered by the second-tier aggregator server 85, by selection and use of value-added tools/analytics software and/or services 87, or by provision to the user of sufficient access to the component data to apply custom methods of their own design. Such access might include ability to receive individual item PSMD (with personal data excluded), but such capability can also be enabled by allowing user submission of custom conversion programs in the form of software components, such as scripts, applets, or agents, that can be run at a third party aggregator server 14 to create a custom-processed aggregation that can be summarized for the user without ever divulging the individual item data to the user. Similarly it will be preferred that the sophisticated user optionally be able to control which of a possible set of collection sources are used for any given aggregation and analysis task.

A basic aspect of conversion in support of the aggregation process is that of data format conversion and of transport protocols for all movements of PSMD, including submission from consumers to collectors, and forwarding to others as feeds or on demand. Preferably such formats would be based on standard data interchange formats and protocols, such as XML, and variations in formats would be defined in XML schema, and transport protocols would be based on standard protocols such as Hypertext Transfer Protocol (HTTP) and SOAP, common messaging middleware, or other open and widely accepted methods. Standard methods for data distribution, transformation, and mining could be applicable to at least a portion of these tasks (including both established methods and newer XML-based tools such as IBMs Visual XML Transformation Tool), augmented as needed by specialized methods suited to the special requirements of PSMD. Preferably conventions would be established for level of detail to be stored and provided for different PSMD market roles and applications, and for selecting specific subsets of data by data element type, by groups of item instances, or by other groupings such as life-cycle stage or trigger event, and specific associated XML formats and schema may be used for each.

A further application of PSMD and point of integration with shopping bots would be to enable combined analysis of pre-sale feature data with post sale rating and operational data. Currently advanced approaches for purchase decision support analytic tools that work with pre-sale feature data are reflected in the Active Research service and U.S. Pat. No. 5,983,220. One approach to such a combined tool might be to gather post-sale utility feedback on each attribute for which pre-sale data is available. Given such data, a weighting could be used to combine the user's desired attribute weightings with not only the pre-sale specifications but also with both the post-sale consumer ratings and the post-sale operational data. Thus where Schmitt suggests summing attribute weightings of W times a pre-sale attribute utility $u_{pre\text{-}specified}$, one could multiply each such value by the post sale utility rating $u_{post\text{-}rated}$ to derive a combined overall value reflecting both promised and realized utilities. Similarly, operational data could be transformed to a value on a similar utility scale, $u_{post\text{-}operational}$ that could also be used as a multiplier. Variations could factor the post-sale data using additive weightings or other combination functions, rather than the multiplicative method just described.

In a further variation on methods of triggering PSMD collection events, additional techniques may be applied with a consumer's permission to facilitate recognition of event triggers relating to transactions even without the cooperation of the transaction counterparty. As described above, marketplace server 16 may report a sale, or a payment processing server 18 that processes the payment for the sale may report the sale to the third party aggregator server 14, and other sources of event triggers were also noted. A variety of methods currently used for other kinds of bots can be applied to monitoring activity on a Web site being used by the consumer. These include passive bots, like form-filling bots or AMAZON's zBubbles shopping bot, that watch and collect data during browser activity while a consumer visits and navigates relevant areas of a Web site, and active bots, like current minding and alerting services, that independently log on and navigate such sites on behalf of the user, using the user's ID and password, and collecting the desired data using a screen-scraping approach. A preferable method of access may be offered by Web sites that use more advanced Web services technologies based on defined protocols that provide an application programming interface (API), such as those based on XML and SOAP. In any such case, the bot can obtain data accessible to the user, for the user, without the specific knowledge and cooperation of the party that operates the server, and can be programmed to forward such data to third party aggregator server 14 as a PSMD trigger.

In the case of payment processors, major credit card suppliers now make consumer account details available on their Web sites, so that basic transaction data is accessible for broad portions of a given consumer's purchases. In the case of merchants and marketplaces, as with maintenance service providers, more detail is available in their customer-specific support service Web pages, but the greater number and variety of sites used by a given consumer makes collection more complex. One example of such a merchant service is the SmartMouth service offered by STOP & SHOP supermarkets. Preferably payment processor services could be used as a starting point for a trigger process, and such merchant sites might then be identified to add more specific detail. This might require consumer approval to authorize each newly identified data source, after which the ongoing process could be automatic. Preferably, in time, more interoperable and open interfaces based on integration technologies such as XML and Web services may become prevalent, possibly with the intent of supporting bots on the consumer side, whether supplied by the vendor, or by third parties. Preferably a combination of techniques would be used, including semi-automated drag-and-drop aids for manual data entry, and automated techniques would be tuned to as many sources as possible by drawing on provider-initiated efforts at universality, complemented by user listing of sources not yet included. Note that such techniques are also applicable to pre-sale use in shopping bots, such as to identify situations where a user is shopping and viewing a product page, to pop up relevant PSMD and support services.

Use of such techniques for triggering without counterparty cooperation would primarily be used while marketplace acceptance of PSMD collection was not widely accepted, and may become unnecessary with increasing acceptance. Preferably, incentives can be provided to gain cooperation of parties that can serve as PSMD collection triggers. Such incentives would include access to the resulting data for market research purposes, and consumers could be asked to permit detailed supporting data to be provided to specific such parties on a selective basis. Such cooperative behavior would support closer vendor-consumer relationships by facilitating direct feedback on products and services as a complement to the direct channels that a vendor might be able to establish. Other methods for gaining cooperation of possible trigger point information sources, include the granting of exclusive promotional relationships (which may be temporary) and the establishment of new counterparty organizations specifically constituted to be cooperative as trigger points, such as a new credit card provider.

Reviewing this more broadly, it is evident that the early development of the various DSSs, bots, or agents described here will likely be fragmented in various dimensions. The preferred solutions will provide a broadly integrated and coherent suite of functions that span the full life-cycle of pre-sale and post-sale activities, and that are portable across the range of devices and services used by a consumer. Specific implementation technologies can take a wide variety of forms, and will likely evolve rapidly over time, as noted previously.

While much of the above discussion has highlighted opportunities and methods relating to collection of operational data from smart devices as items that have within themselves the capability to collect and submit operational data on their use, one skilled in the art will recognize that many of these methods may be applied to the full spectrum of operational data, including cases where the data is obtained using intelligence that may be partially external to the item (such as when using an asset management system). Some further discussion of these variations and associated terminology follows.

As noted previously, the term "item" should be understood to include both "real," physical items (consisting of atoms), and "virtual" items of ideas, information, media content, or software, including purely digital items (consisting of bits). Virtual items should be understood to include intellectual or aesthetic items, including content items, ideas, writings, and works of art, as well as logic items, including software programs, software agents, and the like, that can be rated, and (when embodied in a suitably instrumentable form or usage environment) for which operational usage data can be collected, as was mentioned previously for Web pages. Digital virtual items represent a case amenable to reporting of operational data. Digital virtual items may depend on associated real items, such as players, viewers, or browsers, as well as remote servers for their use. Digital virtual items may also contain embedded intelligence in the form of logic that is executed using resources of an associated real device, such as for digital rights management (or for software program items). Conversely, real items, such as smart devices, may have digital elements, such as embedded intelligence. Depending on the embodiment of these methods with regard to use case and context, a digital device such as a computer may be considered an item with or without its application software, and such software may or may not be considered a distinct item.

Both ratings data and operational data may apply to both real and virtual items. Operational data on real items may be collected internally by use of intelligence within the item, as a smart device, but may also be obtainable from measurement instrumentation or management systems external to the item. Such instrumentation may involve data, logic coding, logic processing, and communications, and any or all of those elements may, in different embodiments, be internal to an item, external and local to the item, or external and remotely provided over a network (and such resources may be controlled by the user or by third parties). Operational data may also be collected from virtual items, and this may be done externally, such as from a Web site that serves the item (remote intelligence) or from a viewer or browser program that presents or otherwise enables use of the item (local intelligence). An example of such data being collected using data and logic internal to a virtual item is the case of a smart virtual content item that contains embedded logic coding, as for example in the case of digital rights management logic or other advanced logic functions that may use external logic processing resources. Internal intelligence may also involve communication with remote support services. A related variation is the case of items which are consumed by other items, in which case the consuming item may collect operational data relevant to the consumed item, such as the case of the number of paper jams in a laser printer serving as operational data not only for the laser printer which collects it, but also potentially for the paper as an item, as well, in what can be considered composite item or multi-item-type operational data. It should also be noted more generally, that when an item is used in conjunction with a local adjunct, or with a remote service provider, such as a Web site (or Web service, or remote service using other network technology), embodiments could provide for operational data on that use to be collected by the adjunct or remote service.

As described above, in certain embodiments all collection or use of operational data for purposes of PSMD and beyond the actual operation or support of that operation is with the explicit, opt-in permission of the user. However, it should be understood that non-approved collection (or opt-out collection that occurs unless explicitly rejected) can occur in other embodiments.

It should also be understood that operational data may be obtained from the use of an item in conjunction with local or remote adjunct services that support the use of the item, and further that this may occur independently of the intent of the user to submit operational data for use as PSMD. For example, the playing of a CD in some players invokes the lookup of descriptive data from www.cddb.com that enables a remote server to track each time the CD is played. In this particular case, the CD item itself provides only static data (as opposed to dynamic data on the state of its operation) that enables its identification (based on its track timing signature), and the operational data is obtained by the player, but that identification is not really about the player as an item, but uses the player as an instrument to collect data about the use of CD as an item (although data on the duration of tracks actually played can also be used as operational data about the player as an item). Similarly, the data on use of items that can be collected from a Web browser (data on pages viewed) or a television set or set-top box (data on programs viewed) is not really data on the use of the browser or TV, but a use of that item as an instrument to collect secondary data on the use of the pages and programs. These examples highlight two distinctions: 1) the distinction between self-reported (or directly reported) operational data from an item about the use of that item itself, and indirectly reported or derived operational data about an associated item, with these examples (CD plays, Web page-views, and TV program viewing) being cases of indirectly reported operational data, and 2) the distinction between explicit reporting of operational data for use as PSMD and byproduct or implicit reporting of operational data reported (or observed) in the course of obtaining services or support, and that may or may not be intended and/or authorized for use as PSMD as well. In this usage, the location of logic coding that controls the reporting could be a primary determinant of self-reporting, so, for example, the case of collecting usage data on a digital content item containing embedded digital rights management logic coding can be considered one of self-reported operational data that may be implicitly reported (unless special provision for authorization is made) using external logic processing and communications resources. The data obtained may be considered byproduct data, since its primary intent is for control of access entitlements not usage analysis. Another example of interest is the use of a Web search engines that obtain implicit, observed user feedback relating to the relevance of a search result (such as time spent viewing the page). Here the data relates not to the Web page as an item in itself, but to the search result, with regard to its relevance to the specific search request, and is thus considered direct operational data relating to the search as a software/service item.

Variations in embodiments such as just noted may also vary in the extent to which use of an item depends on access to remote resources and services. In some cases an item can be used effectively in isolation (or in a temporarily disconnected state), while in others, network access is more or less essential to the intended use. Over time, more and more items will tends toward network-dependent use, although many will seek to retain utility when network access is unavailable. The location of the instrumentation elements that enable operational data collection may be varied in a generally similar and more or less related fashion (and use of embedded intelligence can be expected to increase over time).

It should also be clear that certain kinds of observed operational usage data, such as the examples just cited on content item use popularity, can be used as a surrogate metric that effectively enables an implicit user rating to be crudely inferred without actually requiring an explicit rating action by a consumer. Also, conversely, ratings data can relate to user estimates of operational data. Conversely, users can be asked to explicitly report estimated operational data (such as frequency-of-repair, handling, and fuel economy for a car), in more or less precise terms, as a substitute for collection of actual measured operational data. Thus, in many cases, ratings data and operational data may be complementary and partially substitutable sources of data that may be applied in varying embodiments of the methods described here, as alternative estimators for the same desired underlying utility metric. It will be understood that, for the most part, 1) measured operational data is an objective estimate of an underlying objective operational usage metric (one that can correlate to related subjective preference metrics as an alternative to reporting of such data), 2) explicitly reported ratings data is a subjective estimate of an underlying metric that may have partly subjective meaning (one that can correlate with objective operational data), and 3) explicit human reporting of operational data is a possibly subjective estimate of an underlying objective metric.

It should be understood that many of the finer distinctions just noted are relative, not absolute, being related to the context and usage of the item and the data, and may apply only in part. For example, as mentioned, data on CD plays can be used as data about both the CD and about the CD player as items. Also, operational data may be self-reported by a smart device, and may be collected by an asset management system or other adjunct system that may be external to the device before being reported as PSMD. For example, such data may include portions that are derived or summarized by the asset management system, and thus may be considered self-reported in part, but not entirely so. It should also be understood that the term "summarized" as used herein, is used to apply both to summarization of individual item data, such as reductions, derivations, and histories that may occur at the user location (or elsewhere) and to summarization of aggregations of data across items that will typically occur elsewhere in the aggregation process, as will be clear in context.

This discussion further highlights the variety of kinds of rating and operational data that can be applied to provide metrics of utility, both as estimators of utility of a given feature of an item, and in combining the evaluation of multiple features to evaluate overall utility of an item. In developing analytic methods for the various levels of aggregation and use of PSMD, it should be understood that this involves problems in the selection of feature sets and the setting of thresholds that have been extensively studied with regard to signal detection and decision methods, to optimize separation of signal from noise with regard to minimizing both false positives and false negatives, at some combined level that seeks economic optimality. Based on the teachings provided here, one skilled in those arts will be able to apply those methods, including such techniques as the use of receiver operating curves (ROCs) and other methods based on Bayesian statistics, including those described by Coetzee et. al. in "Feature Selection in Web Applications Using [ROC] Inflections" (Symposium on Applications and the Internet, Jan. 8-12, 2001) and similar methods applied to correlating implicit and explicit ratings data as outlined in Miller U.S. Pat. Nos. 6,016,475, 5,842,199, and 6,108,493. It is further noted that related methods described by Kanungo in "Receiver operating characteristic curves and optimal Bayesian operating points" (Proc. of IEEE Int. Conf. on Image Processing, Washington, D.C., October 1995, vol. 3, pp. 256-

259), may be used in a manner that will be apparent to one skilled in the art to eliminate sensitivity to assumptions of Gaussian (normal) distributions that may occur in those methods and in some of the methods of normalization described herein. It should be understood that Bayesian methods are broadly applicable to the task of normalizing out a user's rating bias for an item, given prior data on that user's rating bias on other items.

With regard to obtaining user agreement to provide ratings data, alternative embodiments may enable users to grant a blanket agreement in advance to provide PSMD for some or all of specified groups of items, marketplaces, or collectors. References to obtaining user agreement to provide ratings data should be understood as inclusive of such prior agreements.

While emphasis has been on the use of PSMD by consumers, and secondarily by vendors, marketplace servers, and payment processors, such market data may often be used by other parties, such as by competitive vendors, by vendors seeking to identify new opportunities for better or alternative products or services, for related and aftermarket products or services, for marketplace exchange and support services, and many other possible uses.

In understanding the range of possible trigger events, it should be clear that, just as for operational data, collection of ratings data can productively be triggered just by usage of the item (if that usage event can be sensed in some way). The use of the term "trigger" is meant herein to include any kind of trigger event relating to an item that can be used as a cue to enable, request, or activate collection of PSMD.

It should be understood, consistent with the usage above, that a collector service typically serves in the role of what is considered to be a "first-tier" aggregator, providing limited, basic, direct aggregation of individual PSMD (as opposed to a second-tier aggregator or consolidator role that involves aggregation from multiple PSMD collections assembled by multiple collector services). The term "collection source" is used as synonymous with collector service to refer to such first-tier aggregations of PSMD from individual sources. The term "source" may be used to refer to either a collection source (which may be accessed as a database or as a data feed, which can be used to build a database) or an individual source of PSMD (or to some other kind of source), as will be clear from context.

It should be further understood that "server" and "service" are used herein as synonymous, except where it is clear in context that "server" pertains more specifically to the system resource that provides a service, and "service" to the role or act of providing it.

Some further discussion relating to variations in the allocation of servers and roles as described in relation to FIGS. 1 and 8 may be helpful to clarify concepts and terminology. Distributed processing techniques seek to provide automated functions flexibly and efficiently by using resources that may be scattered over a network, including use of distributed servers, distributed databases and data collection, caching, remote services and applications service providers, and use of Web services composed from service elements on distributed servers, and this technical distribution can tend to obscure the distinctions of the roles identified. Except where indicated otherwise or clear in context, references to the roles of enterprises, organizations, or other entities described here, such as marketplaces, aggregators, and the like, and to the servers that perform the services provided by those entities, is meant to refer to their organizational identity and business operations role as distinguished from other organizations, and similarly, in reference to software and hardware resources used to provide services by such entities that may be embodied in distributed configurations at locations not under their direct control (such as facilities hosted by others), it is the entity responsible for the "ownership" and management control of those service-providing functions that is meant to be referred to. Such a use of distributed nodes that distribute aspects of the role of one player on its behalf to locations, facilities, and systems hosted by another player should be understood as technical implementation details that do not alter the scope and substance of those roles.

For example, a first-tier aggregator service that provides basic collector, aggregator, and access services may form business relationships with a set of marketplaces to facilitate and promote its ability to serve the customers of those marketplaces, and to encourage those marketplaces to present the aggregator's services as a value-added feature to their customers. With such relationships in place, some integration of aggregation services with the marketplace's Web services may be desirable, such as, for example, offering ratings data access during product selection, and some distribution of aggregator functions to the marketplace's Web server facilities may be technically advantageous. For example, portions of the collection and access services may be provided to customers on pages that appear to be more or less integrated with pages of the marketplace's Web sites, and/or portions of those services may be performed by software that is provided by or controlled by the aggregator, and logically associated with the aggregator role, but that is run on physical servers co-located at the marketplace location (including cases of co-residence on a server device that also runs marketplace-controlled services or even of partial integration with marketplace-controlled software), thus acting as distributed nodes of the aggregator that are located at the marketplace site. Such nodes at a marketplace location might provide some subset of services to end users, and might act as caches to the aggregator databases for purposes of data collection and/or access. Such configurations might more efficiently serve users as they use the marketplace Web site, and reduce sensitivity to outages of network links that may connect to the aggregator, but this technical arrangement does not change the essence of the functions performed into marketplace functions, and in this example, the cache is logically part of the central aggregator database, even though physically distributed. Thus such collector and access functions are meant to be included by the term aggregator server, even if portions of them actually run on, or are partially integrated with, a marketplace server.

Further to the earlier discussion of role blending, such blending is meant to apply with regard to the logical substance of the roles, not the physical and/or technical distribution. Thus, for example, it is possible that marketplace and aggregator roles could blend, such as if an enterprise that operated a business as a marketplace also operated a business as an aggregator by providing and managing such services itself, whether it did so only for its marketplace customers, or if it provided such services to customers of other marketplaces as well. However, this would be based on the business nature of the services provided and the entity's level of organizational control over that, not on the technical distribution with which they were supported.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

APPENDIX A

Sample Data Elements

Sample #1 PSMD Data Elements (Product=Auto)
  Basic Info (Product Independent)
  User Data (*Items that Might be Restricted for Privacy)
    Consumer ID*
    Consumer Demographic data*
    Anonymous ID
    Transaction Type (purchase, delivery, periodic, maintenance, failure, sale, etc.)
    Transaction unique ID
    Transaction validation tokens/source validation tokens
    Transaction timestamp
  Product Data
    Item type ID
    Item instance ID
    Make, model, year
    Options/accessories
    Serial #*
    Manufacturer
    Dealer/Vendor
    Assembly plant, Key subsystem type/source info
    Service date
  User rating Info (rated as both absolute and value/price-adjusted rating—as numeric rating—eg. 1-10)
    User Rating
      Timestamp
      Overall rating
      Performance (power, handling, etc.)
      a Reliability
      Maintainability
      Durability
      Fuel economy
      Cost of ownership
      Fit and finish
      Comfort
      Appearance
      Amenities
      Would buy again?/Would buy a different category instead?
    Trust data (for given user on this rating task and all other tasks)
      User objectivity scores (skew to good or bad)
      User consistency scores (tendency to average or extreme)
      User affluence/price-sensitivity scores
  Operational Data
    Performance/Duty Cycle
      Timestamp
      Miles (total, since last report)
      Speed (average, max, 90%-ile)
      Acceleration intensity/frequency indexes
      Fuel parameters (octane, flow rate, temperature, etc.)
      Other engine computer load/performance indexes
      ABS/traction control/Braking intensity/frequency indexes
      Driving condition parameters (temp., hills, stop/go)
      Cornering intensity/frequency indexes
      MPG
      Trip length indexes (short/long, frequent/infrequent)
      Engine hot/cold index
      Improper operation data (delayed maintenance/excess load)
      Other available data (on summarized/reduced basis)
    Maintenance Data
      Timestamp
      Scheduled maintenance triggers and completions
      Warning and failure event data
      Repair action details (work done, components replaced, consumables, developing problems, certification level)
      Accident/damage reports
    Cost of Ownership Data
      Timestamp
      Cost category (lube, tune-up, tires, etc.)
      Cost element (consumables, parts, labor)
      Cost amount
      Linkage to performance of maintenance events Sample #2 PSMD Data Elements (Product=Laser printer)
  Basic Info (Product Independent)
    Consumer ID*
    Consumer Demographic data*
    Anonymous ID
    Transaction Type (purchase, delivery, periodic, maintenance, failure, sale, etc.)
    Transaction unique ID
    Transaction validation tokens/source validation tokens
    Transaction timestamp
  Product Data
    Item type ID
    Item instance ID
    Make, model, year
    Options/accessories
    Serial #*
    Manufacturer
    Dealer/Vendor
    Assembly plant, Key subsystem type/source info
    Service date
  User Rating Info (Rated as Both Absolute and Value/Price-Adjusted Rating—as Numeric Rating—eg. 1-10)
    User Rating
      Timestamp
      Overall rating
      Performance (speed.)
      Print quality
      Paper handling Reliability
      Printer Reliability
      Maintainability
      Durability
      Toner economy
      Cost of ownership
      Ergonomics
      Appearance
      Amenities
      Would buy again?/Would buy a different category instead?
    Trust Data (for Given User on This Rating Task and All Other Tasks)
      User objectivity scores (skew to good or bad)
      User consistency scores (tendency to average or extreme)
      User affluence/price-sensitivity scores
  Operational Data
    Configuration Details
      Emulation/driver type (HP PCL, Postcript, etc) (usage mix if multiple)
      Memory
      Connections and rated speed (serial, LAN, IR, etc.) (usage mix if multiple)
    Performance/Duty Cycle Timestamp
Pages (total, since last report)
Pages per job
Number of jobs
Speed within jobs (average, max, 90%-ile)
Toner usage (since last report—total, per page)
Other load/performance indexes
Page print density indexes (average, max, 90%-ile)
Idle/powersave period frequency/duration statistics
Color pages, color density, color mix (average, max, 90%-ile)
Improper operation data (delayed maintenance/excess load)
Other available data (on summarized/reduced basis)
Maintenance Data
Timestamp
Scheduled maintenance triggers and completions
Warning and failure event data
Repair action details (work done, components replaced, consumables, developing problems, certification level)
Accident/damage reports
Cost of Ownership Data
Timestamp
Cost category (toner, repair)
Cost element (consumables, parts, labor)
Cost amount
Linkage to performance of maintenance events

APPENDIX B

Utility Metrics and Normalization Methods

What is Utility?

This term can be understood as both a specific measure of economic utility (or its subjective surrogate), and more broadly as the broad range of measures of utility, value, worth, or quality that inform selection of a product or service. The prime motivation is for metrics that can be exchanged among users or buyers to compare alternative selections. The concept of collection, aggregation, and distribution of PSMD is meant to apply to almost any of such measures, as long as they have some level of shared meaning, and can be aggregated as has been outlined. A variety of such PSMD metrics will be useful, depending on the purpose and domain. Some in particular are outlined here, but preferably the PSMD marketplace will support use of a variety of them, some globally, and some in specific product/service verticals.

Economic utility is one key underlying concept, and is a measure of the true value of a product relative to other economic goods, factoring supply and demand in a perfect market, and underlying pricing and purchase behavior. What is referred to here is closely related to that, but may more usefully be considered the subjective worth of the product or service. The focus for a utility metric (U) for use as PSMD is not the market-transaction-defined economic utility but the post-sale assessment of realized utility. In the case of operational data, this would be an experiential definition of utility. In the case of ratings, this would be the individual's subjective assessment of utility, with the suggested definition being the buyer's sense of "what is the highest price you would consider fair for this," which is clearly subjective to the buyer. This corresponds generally to the idea of "utils," as the arbitrary units of a metric of the subjective satisfaction gained from an item. The point is that ratings provide an estimator of utility as subjective satisfaction or value obtained, and not necessarily of actual price. (A specific metric for U that can be viewed as dollar-denominated utils is suggested.) In fact, that is the point of distinguishing U and U/$. Some buyers are motivated only by absolute utility (or worth or value) while others are price conscious, some to the extreme that they buy "bargains" that they don't really value except for being a bargain. The use of both metrics (U and U/$) enables different buyers to use different economic utility/value criteria. Here again, the precise metric for U may vary. An even purer, less price-sensitive concept of utility ($\underline{U}$, "what is the highest price you would consider fair, if you were wealthy and had all the money you wanted") is described below, and all of the methods discussed should be considered to apply equally to the first-described form of U and $\underline{U}$.

Product ratings can also be understood as composites of multiple feature attributes. This can apply to subjective post-sale consumer ratings or, similarly, to objective pre-sale product feature specifications. The purchase analysis process seeks to maximize an objective function (a utility function) that is an that defines the desires of a buyer, and combines multiattribute objective feature utilities that are presumed to be realizable to find a match. What is addressed here as U for PSMD is a utility function that defines the utility as actually realized on a post-sale basis. The purchase decision process thus can be viewed as 1) the definition of a desired utility objective function and analysis of 2) supplier-specified pre-sale presumptions of utility (which may not be realized or perceived) and 3) user-realized metrics of actual realized and perceived post-sale product utility, to 4) determine overall rankings for an optimum expected match. The emphasis of this work is on enabling number 3.

The precise meaning of utility or U is difficult to define, and different raters have varying utility functions. As discussed below, the combination of U, U/$, and a set of multiattribute component utility factors can provide a basis for structuring this elusive and subjective value in a way that provides useful purchase decision support. For purposes of PSMD, consistency, decomposability (into sub-attributes), and intuitive understanding are more important than precise objective definition of utility.

At a high level, PSMD services relating to ratings involve consideration of the metrics, what is measured, whether total utility or component attributes the scales on which they are measured, whether linear and bounded or not the expected distribution of ratings on such scales (for a large variety of item types), whether uniform, normal, or other.

normalization processes used to relate ratings from different raters using the same metrics and scales, which may involve adjusting ratings to a desired distribution (a curve) for a rater or group of raters normalization processes used to relate ratings from different aggregation services that may use different metrics and scales to obtain "comparable" metrics, such as by rescaling It is preferred that this will be an open and evolving marketplace, with new methods appearing, being integrated, and gaining or losing market acceptance, and with varying options and choices as to what "comparables" are usefully combined for a given purpose.

Rating Metrics, Scales, and Distributions

Product ratings are often purely descriptive and anecdotal, but when they are quantified it is most common to do this on an arbitrary linear numeric scale, which may have associated descriptors, but in which it is usually just assumed that the lowest value means worthless, the highest means wonderful, and the midpoint means acceptable or average. Thus current rating systems generally ask for ratings on some arbitrary linear scale, such as 1-10, 1-5, 1-100, and rarely give much guidance of what the metric is or what those numbers mean, on the assumption that this is generally understood. Some will use words or descriptions to characterize the various levels, such as poor, fair, average, good, and excellent, for a 1-5 scale. Similar units may also be called stars or some other symbol, and can include negative symbols (such as turkeys).

Given the wide use and familiarity, it is expected that such metrics will continue to be used, but preferably improved metrics and scales will increasingly supplement or replace them. Such metrics are usually approximations to the subjective economic utility metric suggested above. By distinguishing U from U/$ and giving specific guidance on usage, a superior metric can be introduced, since these are often confounded in current practice.

Some basic methods for specifying a metric U follow, but it would be desirable to do field studies to develop and prove out the most nearly optimal ways to communicate the metrics and the scales from the perspective of rater and buyer behavior in order to find the format that is best in terms of ease of understanding for entry and use, ease of collection, ease and accuracy of normalization and aggregation.

A bounded, non-negative scale may not be the best choice for a utility scale that consumers are to rate with. Instead, consider as a suggested metric for U, "what is the highest price you would consider fair for this," which has appeal as expressing subjective utility in terms of a price, which corresponds to an economic value. In theory U can have any value from negative infinity to positive infinity, but in practice, most ratings will center about some sensible range, with some distribution, perhaps a variant of a normal distribution. Negative ratings for U would occur when a product has negative value. Toys containing nuclear warheads would have very high negative U. When the Daily News offers a free trial subscription, the consumer can point out that they will not read it and would just have to throw out more trash, and ask how much the publisher will pay the consumer to subscribe. Some businesses are based on providing products that have negative utility to many customers, such as magazines aimed at CEOs because of their advertising demographic value. Similarly, a painting loved by a rich person may have very high positive U, far higher than market value, if the person's tastes are unusual (and the product thought to be under-appreciated by the market) and limited means do not compress his utility scale. People buy stocks precisely because they believe U to be greater than the price, due to market under-appreciation.

Following this approach, for example, consumers might be asked to rate their $25,000 list price Honda in terms of "what is the highest price you would consider fair," and consumers might pick values that center around $25,000 but some would pick values much higher or lower. (Very low positive or negative values might be more prevalent for Ford Pintos, and very high values might be more prevalent for Miatas.). The pattern for such ratings might well be described by a normal distribution centered not very far from the price (for products of average value), and with a deviation that clusters reasonably around that mean. Other distributions might be more suited to describe such a pattern (and the best choice of distribution might vary from product to product). Log-normal—or perhaps other common distributions such as exponential, Poisson, binomial, gamma, chi-square, Weibull, etc.—might be useful. Preferably empirical psychological and market research would be applied to select an appropriate distribution.

As shown in FIGS. 9a-d, such a distribution function provides a means to relate such dollar values of U to an underlying utility scale (u) that is more tractable for interchange. A preferred method is to let u be a cumulative distribution function (cdf) for ratings that is analogous to a common cdf as used in statistics, so that u is a bounded utility scale ranging from 0 to 1, with a uniform distribution of ratings on that scale, all of which provide computational convenience for this scale u to be used in conversion and normalization. The convenience results from the fact that u is a fractile rating, corresponding to the fractile of the rating population that gives a rating less than or equal to u.

FIG. 9a shows such a case, with the x axis being in units of U. This can be redrawn as in FIG. 9b, in which the x axis is u, so that the scale for u is linear. For example, if the Honda U values had a mean of $25,000 and a standard deviation ($\sigma$) of $5,000, this might be well described by a normal curve if about 68% of the ratings were between $20,000 and $30,000 and symmetrically distributed. A U=$minus infinity would give u=0.0, a U=$15,000 ($-2\sigma$) would give u=0.0228, U=$20,000 ($-\sigma$) would be u=0.1587, U=$22,500 ($-0.5\sigma$) would give u=0.3085, U=$25,000 (mean) would give u=0.5, U=$27,500 ($+0.5\sigma$) would give u—0.6915, U=$30,000 ($+\sigma$) would give u=0.8413, U=$35,000 (+2%) would give u=0.9772, and U=$infinity would give u=1.0. Such a normal distribution gives a mapping of U to u that may be workable, but in practice, the actual distribution of U may not be normal, and thus some other distribution function may be used to better approximate that case and thus produce a more uniform distribution for u.

This bounded utility function u is more comparable to the commonly used bounded rating scales, and can easily be used as the common format for expressing such ratings so that they can be related to one another. In a simplistic mapping we can simply convert values on the assumption that they are all similarly distributed. Thus a scale of 0-10 is mapped by simply dividing by 10. A 1-10 scale can be converted to a 0-9 scale and divided by 9. Similarly for 0-5, divide by 5, and for 1-5, subtract 1 and divide by 4.

Here again, actual ratings using such rating scales may not be truly uniformly distributed, so a better normalization method would use a corresponding empirically-derived distribution function to map those ratings to the bounded and uniformly distributed u scale, as described further below.

A normal distribution has computational attraction for relating U to u, but these concepts may not be very consumer friendly. Rating on a scale intended to yield a normal distribution (or any other non-uniform distribution) may be more acceptable and understandable if a graphic representation can be used with an interactive display. Raters would be presented with a proposed rating graph, such as the common normal curve (which may also show marked values and sigma levels), much like that in FIG. 9a, and select the rating they wish to give by pointing to or entering the value. This could give them full freedom to rate on the proposed U scale, while clearly showing the structure of the scale and suggesting how average or extreme each of the possible ratings would be, and showing the result in terms of the bounded and uniform value of u as well. Conventional graphs of the normal curve that show bounded and uniform u could be used individually or in combination (such as FIGS. 9a and 9b). Such a presentation might be done with a static specification of the distribution, or with actual dynamically updated versions of the distribution that fit the actual ratings done to date. Users of ratings could also be presented with the actual aggregated version of the same graph, showing both U and u. Consumers may need some accustomization to become comfortable with such graphs, but they might be highly useful if such use and familiarity were to become commonplace.

Consumers could also be asked to provide the price they paid ($), or a standard list price could be used. In either case, the equivalent graphic for U/$ could also be provided. As shown in FIG. 9a, this is really the same graph, with a different units legend, and both can be shown together.

Such feedback on where a rating fits relative to other raters can help the rater self-normalize. Obviously this would have to be presented in a way that did not unduly influence the rater to follow the lead of others. Getting an initial blind rating, and then providing feedback to be confirmed, using the graphics suggested, might be a desirable compromise. Feedback on U/$ would also enable the rater to credibility check the rating for U.

It should be understood that in using normal curves or other similar distributions, it is not intended that this is meant to induce the overall ratings for a given item to center about an "average" rating. The mean of the distribution can fall anywhere on the rating scale, whether at an "average" rating or not. It would be expected that for groups of many item types, the mean would tend toward an average rating, but for any one item type, the mean could be far above or below that—if the items are very good or very bad. In any case, the variability about that mean might still be well described by a normal distribution.

Reviewing this in more mathematical terms, the post sale ratings of individual buyers (as well as their operational experience) can be treated as random variables. With simple discrete rating scales these would appear to be discrete variables, but to better measure utilities, they are preferably continuous variables. Perceived total utility metrics may relate to price or value, which can range from minus to plus infinity, but tend to cluster within a reasonable range about a central value, with some distribution. Similarly component utilities may be expressed in terms of domain-specific parameters (speed, power, capacity, mean-time-to-failure, etc.) that also have some distribution about some mean. These distributions may be effectively approximated as normal or log-normal, or perhaps by other common distributions such as exponential, Poisson, binomial, gamma, chi-square, Weibull, etc. Analysis and comparison of ratings is understood relative to the distribution of ratings in a given population of raters, using standard statistical methods. Ratings are described by a probability density function (pdf) for those ratings, or a ratings density function, and the relative meaning of a rating within a population can be understood in terms of a cumulative distribution function (cdf) which is the integral of the pdf (and can be visualized as the area under the pdf curve up to the given value). The cdf specifies the fractile rating, which can serve as a dimensionless and standard way to compare ratings.

Normalization Within a Collection System

Different individuals may tend to rate differently, such as lenient or harsh, extreme or moderate, or with other peculiarities that distort the ratings. One method for normalizing these factors is to track the consumer's rating history to build a known distribution, and then adjust the ratings internally to map the consumer's distribution to either the population norm or the externally defined intended norm. This could be done locally to the consumer's ratings bot or agent in a fully private way (and one that applies across all collection services), or it could be done at the external collection server. In either case the method would be based on analysis of the distribution of the consumer's ratings relative to the distribution of the ratings of others who rate each item type.

Such a characterization of a given consumer's ratings for different items requires a scale that is comparable across items in terms of relative rating. This is not the case for U as dollar-denominated, since a low rating for a Honda of $15K would appear much better than a high rating for a kitchen blender of $300. It is the case for U/$, which makes ratings relative to price, and ratings in terms of dollar-denominated U can easily be converted to equivalents in terms of U/$ prior to adjusting for individual variation. The same ratings on a U/$ scale might be 0.6 for the Honda and 0.9 for the blender. Other transforms with similar properties may also be used.

Thus if a consumer rarely gave a bad rating, his responses could be skewed downward by any of a variety of mappings. Another consumer might always rate things near average, so the mapping might stretch that consumer's curve outward in both directions. For a simple example, take a consumer that rates harshly, as shown in FIG. 9c, which shows a chart that can be generated based on comparing a number of values of U/$ for various items for that consumer to those for a population of other raters. Thus FIG. 9c shows a source distribution for that consumer (for multiple items), and 9a shows a target distribution (for many consumers on the same target item). Note that in FIG. 9c, the dollar denominated U scale shown is illustrative of the Honda and that scale would apply only to the one rating value for the Honda, but the U/$ scale would apply to ratings for all items by that consumer.

It is possible to characterize each of the source and target distributions in terms of four key parameters that have well known statistical meaning: 1) average or mean, 2) standard deviation, the variability or second moment about the mean, 3) skewness, the relation of mode to mean, or third moment about the mean, and 4) kurtosis, the peakedness or fourth moment about the mean. Standard curve fitting techniques based on these parameters can enable the specification of source and target distribution functions, which can then be used to define mapping functions to convert from one distribution to another. (Background is given in www.qualityamerica.com/knowledgecente/knowctrDistributions.htm.)

For this example, simple graphical methods are shown to illustrate the process, but in a typical embodiment, automated computation would be more readily programmed using the curve fitting approach. In any case, the method uses the cdf to translate the ratings from a base scale, such as U/$ to a cdf-based scale u. These ratings u are effectively the fractile rating (equivalent to a percentile rating), so that an "average" rating would have a fractile value of 0.5, meaning that half of the ratings were better and half were worse. Using approximate values as shown, a table as shown in FIG. 9d can be derived. For each fractile value of u, corresponding values of U and U/$ are derived for each of the individual source distribution and the group target distribution that the individual is to be normalized to. Thus the u=0.5 rating for the individual, given as $20K, translates to a U/$ of 0.8, which would be understood to be an undesirable rating, but is mapped to the normalized target value U/$=1.0 or U=$25K, which is thus seen to be an average rating after compensating for the apparent harshness of the individual. Other similar conversion cases are also shown. An automated process that uses curve fitting would follow equivalent steps to give approximately equivalent results. The method would work for other rating scales, as long as they use, or are first mapped to, a scale that gives comparable ratings across items (like U/$ but not the dollar-denominated U).

Other methods for developing broadly applicable normalization functions using statistical methods will be recognized by practitioners skilled in the art. These might also draw on established cognitive principles and experimentation (such as psychographics).

Normalization mappings might also be weighted to leave some rater skew, to avoid the risk of falsifying valid extremes (where a consumer validly has non-average experience), such as when few ratings have been obtained, or when inherent variability for an item type or rater is high. In other words, the methods would seek to adjust for non-uniformities that could be inferred to be peculiar to the rater as an individual and not meaningfully reflective of the rater's experience of the item itself for purposes of inferring how another consumer (the prospective purchaser) might experience the same item, but not to normalize out the underlying patterns relating to the item itself. This could be done by using a weighted combination of the raw individual rating and the fully adjusted rating to obtain a partial normalization (and such weighting could be varied heuristically for best results). Naturally normalization will not be very effective without a sufficient number of data points to work with.

An extension would seek to obtain a pure U that removes individual price sensitivity variations. The form of U so far described in terms of "what is the highest price you would consider fair," still has implicit some varying levels of price-sensitivity, depending on the rater. A rich person would typically be less sensitive than a poor person, so that such estimates of U are not as fully comparable as intended. An alternative ($\underline{U}$) would be something like "what is the highest price you would consider fair, if you were wealthy and had all the money you wanted." This may better achieve the objective of getting a pure utility metric $\underline{U}$ that rates the absolute value of a product to a person independent of cost, which can be used with a price-relative utility, $\underline{U}$/$, to make an appropriately price-sensitive decision. We can apply similar statistical methods (based on the consumer's rating history and on other economic information) for normalizing $\underline{U}$, as well as similar UI tools (such as graphics and feedback) for aiding the consumer in setting $\underline{U}$ and U in a consistent and meaningful way.

Normalization Across Collection Systems

Similar normalization mappings can be done across rating collection systems. For each system with a different utility metric (U)—or with the same metric but with varying population characteristics or collection methods—a range and distribution for U (whatever rating metric is used) could be developed. This could be learned externally by a receiver or aggregator of the ratings or it could be generated and provided as a reference (metadata) by the rating collection sourcing service, itself. Each set of ratings could then be converted to a standard reference form, such as the cdf-based fractile u. Thus ratings on 5 or 10-point scales could be normalized to the 0-1 scale of u (or to some other common base, whether a particular one of the sources or some external standard like u). Such a conversion, as above, could assume uniformity and simply adjust the range, or it could measure the actual distribution of ratings and use curve-fitting (or more advanced statistical methods) to find a distribution function to map to a uniform base scale, such as u.

Once normalized in this way, data from any rating system can be aggregated with and compared to data from any other rating system. This could enable production of a single database of all ratings from all sources, but it would be preferable to leave the identity of the data sets intact and allow the decision on whether such normalization should be relied on to be made on a selective basis, possibly combining some sources and not others, or allowing for the use of other normalizing functions based on other kinds of analysis, all under the control of an end-user analyst, or of one or more of value-added aggregation/distribution/analytics services.

It is because of varying and unpredictable dependencies on understanding of the source of the data and the intent of the analysis that an open marketplace that allows for such flexibility is desirable. This would allow sophisticated users to control their own analyses for best results, and enable innovative independent providers of analytic services to add value to the PSMD.

Aggregate and Specific Attribute Metrics

Just as with current product rating and feature selection systems, it is desirable for PSMD to include both overall (total utility) rating metrics, and subsidiary attribute metrics. Some subsidiary metrics may be of general applicability, such as basic ratings of quality, reliability, power, and ease of use. Others will be specific or tuned to a product category or subcategory. A set of standard utility metrics may be defined as a hierarchical scheme, so for example cars, SUVs, and trucks may all share attributes relevant to motor vehicle, while having variations specific to each sub-category.

By obtaining PSMD that includes total utility, U, its uniformly distributed equivalent u, as well as utility relative to price, U/$, and some set of multiattribute components of utility, a buyer can piece together a customized re-evaluation of available utility feedback that is adjusted to match the buyers own objectives for weightings of U, U/$, and the various components. Analytics (analytical tools), as described in the specification, can be used to help the buyer create such custom-weighted views. Just as attributes are weighted to meet the user's profile and objectives, the selection of PSMD sources can also be custom weighted to create custom aggregations to serve the user's current purpose.

Combining Post-Sale Utilities and Pre-Sale Utilities

Building further on this, these post-sale utility ratings can be used in conjunction with more conventional pre-sale utilities in the form of product feature attributes. Thus a tool like that described by Schmitt in U.S. Pat. No. 5,983,220 can be combined with the process described here by using some assigned weightings. This would address all four aspects of the purchase decision process listed in the first section above. One approach to such a combined tool might be to gather post-sale utility feedback on each attribute for which pre-sale data is available. Given such data, a weighting could be used to combine the user's desired attribute weightings not only with the pre-sale specifications, but with the post-sale consumer ratings and the post-sale operational data. Thus where Schmitt suggests summing attribute weightings of W times a pre-sale attribute utility $u_{pre-specified}$, one could multiply each such value by the post sale utility rating $u_{post-rated}$ to derive a combined overall value reflecting both promised and realized utilities. Similarly, operational data could be transformed to a value on a similar utility scale, $u_{post-operational}$ that could also be used as a multiplier. Variations could factor the post-sale data using additive weightings or other combination functions, rather than the multiplicative method just described.

Uniformity and Rating Distributions

The suggested approach to normalization is to seek a common bounded interval scale that results in ratings that are uniformly distributed on that scale. The important idea is that normalization is facilitated when the distribution of ratings on a scale are uniformly distributed, thus avoiding skew or bunching, etc., which may be artifacts of the rating process.

This approach is based partly on the assumption that non-uniformity is a rating artifact to be removed. This assumption simplifies analysis and is believed to have reasonable basis in real rating patterns. To the extent that patterns of some non-uniform distribution can be established as valid characteristics of the underlying utility (for one or more product/service classes), then it may be desirable to use (and normalize to) utility scales for which such a distribution holds. Such approaches might take into account different distributions for different types of product/service (those that are unusually well or poorly rated, or unusually variable), or for different populations of raters (who may have "valid" differences in perceived utility, such as casual users as opposed to professionals). Such approaches might also be used for items that may be inferred to have "ab-normal" patterns in their underlying quality or objective utility (such as if they came from two sources with differing characteristics).

This is clearly a complex issue, and market research and analysis is desirable to interpret and adjust data appropriately. The ability of a PSMD user (or independent analysis service/tool) to get at the underlying data and to use alternative aggregation and normalization methods is a preferable feature. For example, it may be desirable to use camera ratings data from both casual users and professional users, but to treat them separately, or to treat SUV ratings from the Snow-belt separately from those from the Southwest.

Such work can draw on common statistical techniques, and on statistical quality control methods. Quality control (QC) is closely related to ratings, in that quality (such as measured in a manufacturing process) is a major determinant of perceived/realized utility. In the case of operational data, QC methods are directly relevant. QC techniques commonly rely on control charts, which look for variations in sample means (assumed to be normally distributed) of a variable to see if a process is in control, and if there are patterns in changes from the underlying process capability. Patterns of variation in sample means include freaks, drift, repeating patterns (cycles, seasonality, etc.), mixtures (of differing processes), and planned changes. These relate to variations in the underlying process that can be analyzed and interpreted to understand their cause. Similar analysis can be done to aid in collecting, normalizing, and applying ratings and operating data as PSMD. (See www.qualityamerica.com/knowledgecente/ knowctrControl_Chart_Properties.htm and www.qualityamerica.com/knowledgecente/articles/CQEIVH3d.html)

Also, we can consider ratings to be a subjective, and thus fuzzy, statistic that is an estimator of an underlying quality/ value statistic that is an objective property of the product/service. This suggests that fuzzy statistics may also be useful in analyzing and normalizing ratings data. (See: www.mathematik.uni-ulm.de/stochastik/fundl/paper/wolff/fuzzy1/fuzzy1.html)

Note that the statistical methods outlined here generally apply to values on a continuous interval scale. Common rating systems force discrete choices on a discrete integer (or ordinal) scale (such as 1-10), so the suggested conversion to a continuous interval scale is a simplification. While this is believed effective, variant statistical approaches that fully consider ratings as discrete variables may also be useful. (See www.iso.gmu.edu/~falemi/cqi/xchart2.htm) Such variant methods with be apparent to those skilled in the art.

What is claimed is:

1. A method for generating an analysis of post-sale market data for an item, comprising:
    detecting a trigger event corresponding to the item and a current user;
    assigning a unique identifier to the item in response to the detected trigger event; and
    receiving post-sale market data associated with the item that includes operational data related to the operation of the item by the current user;
    retrieving additional item operational data associated with one or more additional item instances, wherein the additional item operational data is collected from one or more independent users of additional instances of the same item type as the item;
    retrieving related item operational data associated with one or more related items classified in an item category that is associated with the item, wherein the related item operational data is collected from one or more independent users of related items;
    characterizing the current user's usage of the item based on the received current user item operational data;
    analyzing item data based in part on the characterization of the current user's usage of the item and the related item operational data collected from one or more independent related item users, as well as the additional item operational data collected from one or more independent additional item users; and
    generating an item data analysis, which is presented to the current user.

2. The method of claim 1, wherein the trigger event comprises a sale of the item.

3. The method of claim 1, further comprising:
    receiving an agreement from the current user to submit the post-sale market data.

4. The method of claim 1, further comprising:
    determining a schedule for submitting at least one rating for the item.

5. The method of claim 4, wherein the schedule corresponds to at least one of: a maintenance history of the item, a periodic evaluation of utility of the item, and a use of the item.

6. The method of claim 5, wherein the schedule commences from an installation of the item.

7. The method of claim 1, wherein the item is one of: a product or a service.

8. The method of claim 7, wherein the item is a service provided over the Internet.

9. The method of claim 1, wherein said detecting further comprises receiving an indication of one of: an online sale and an offline sale.

10. The method of claim 1, wherein said detecting further comprises receiving an indication of the trigger event from one of: the current user, a seller of the item, a manufacturer of the item, a maintenance service provider, and a payment processor.

11. The method of claim 1, wherein said detecting further comprises receiving an indication of the trigger event from a transaction processing system.

12. The method of claim 1, further comprising:
assigning a second unique identifier to the current user.

13. The method of claim 12, further comprising:
associating the unique identifier with the second unique identifier.

14. The method of claim 1, further comprising:
receiving a rating for the item from the current user.

15. The method of claim 14, wherein said receiving further comprises:
receiving a timestamp corresponding to a time the rating was generated by the current user.

16. The method of claim 14, further comprising:
identifying a group of items corresponding to the item; and
determining a group rating for the group of items based on the received rating.

17. The method of claim 16, wherein the item is a product and the group of items is a class of products to which the product belongs.

18. The method of claim 16, wherein the item is a service and the group of items is a class of services to which the service belongs.

19. The method of claim 16, further comprising:
providing the group rating to a plurality of users.

20. The method of claim 19, wherein the plurality of users comprise a plurality of subscribers.

21. The method of claim 19, wherein said providing further comprises:
providing the group rating to the plurality of users over a computer network.

22. The method of claim 16, further comprising:
updating the group rating upon receipt of a subsequent rating from at least one of said current user and a second user.

23. The method of claim 22, wherein said providing the group rating is performed substantially in real-time upon receipt of the subsequent rating.

24. The method of claim 14, wherein the rating is at least one of a utility of the item and a utility per dollar cost for the item.

25. The method of claim 24, wherein the utility and the utility per dollar cost are expressed as a negative value.

26. The method of claim 14, wherein the rating includes a price paid for the item by the user associated with the rating.

27. The method of claim 14, wherein the rating is based on a dollar amount paid for the item.

28. The method of claim 14, wherein the rating is based on a utility expressed on a dollar-denominated scale.

29. The method of claim 14, further comprising:
identifying the current user as a subscriber based on information received with the received rating.

30. The method of claim 14, further comprising:
providing to the current user, in exchange for the rating, at least one of: a monetary payment, an offer of a discount on a purchase, and a credit.

31. The method of claim 1, further comprising:
generating revenue from at least one of: a banner advertisement, a collection of a service fee from a provider of the item, a collection of a membership fee from a user and a sale of market data generated from the received rating.

32. The method of claim 1, wherein the post-sale market data comprises operational data used in generating simulation data for the item.

33. The method of claim 32, further comprising:
wherein the item is a vehicle and the characterization relates to the user's use of the vehicle.

34. A computer readable medium encoded with processing instructions for implementing a method, performed by a computer, for collecting post-sale market data for an item, the method comprising:
detecting a trigger event corresponding to the item and a current user;
assigning a unique identifier to the item in response to the detected trigger event; and
receiving post-sale market data associated with the item that includes operational data related to the operation of the item by the current user;
retrieving additional item operational data associated with one or more additional item instances, wherein the additional item operational data is collected from one or more independent users of additional instances of the same item type as the item;
retrieving related item operational data associated with one or more related items classified in an item category that is associated with the item, wherein the related item operational data is collected from one or more independent users of related items;
characterizing the current user's usage of the item based on the received current user item operational data;
analyzing item data based in part on the characterization of the current user's usage of the item and the related item operational data collected from one or more independent related item users, as well as the additional item operational data collected from one or more independent additional item users; and
generating an item data analysis, which is presented to the current user.

35. An apparatus for collecting post-sale market data for an item, comprising:
means for detecting a trigger event corresponding to the item and a current user;
means for assigning a unique identifier to the item in response to the detected trigger event; and
means for receiving post-sale market data associated with the item that includes operational data related to the operation of the item by the current user;
means for retrieving additional item operational data associated with one or more additional item instances, wherein the additional item operational data is collected from one or more independent users of additional instances of the same item type as the item;
means for retrieving related item operational data associated with one or more related items classified in an item category that is associated with the item, wherein the related item operational data is collected from one or more independent users of related items;
means for characterizing the current user's usage of the item based on the received current user item operational data;
means for analyzing item data based in part on the characterization of the current user's usage of the item and the related item operational data collected from one or more independent related item users, as well as the additional item operational data collected from one or more independent additional item users; and
means for generating an item data analysis, which is presented to the current user.

36. An apparatus for collecting post-sale market data for an item, comprising:
   a processor; and
   a memory in communication with the processor, the memory for storing a plurality of processing instructions directing the processor to:
      detect a trigger event corresponding to the item and a current user;
      assign a unique identifier to the item in response to the detected trigger event; and
      receive post-sale market data associated with the item that includes operational data related to the operation of the item by the current user;
      retrieve additional item operational data associated with one or more additional item instances, wherein the additional item operational data is collected from one or more independent users of additional instances of the same item type as the item;
      retrieve related item operational data associated with one or more related items classified in an item category that is associated with the item, wherein the related item operational data is collected from one or more independent users of related items;
      characterize the current user's usage of the item based on the received current user item operational data;
      analyze item data based in part on the characterization of the current user's usage of the item and the related item operational data collected from one or more independent related item users, as well as the additional item operational data collected from one or more independent additional item users; and
      generate an item data analysis, which is presented to the current user.

37. A method for generating an analysis of post-sale market data for an item comprising:
   receiving operational data relating to the operation of the item associated with a current user;
   retrieving post-sale data collected from one or more independent users that includes item operational data associated with one or more qualifying related items and post-sale data collected from one or more independent users that includes item operational data associated with additional item instances of the same item type as the item;
   characterizing the current user's usage of the item based on the received current user's item operational data; and
   generating an item data analysis by analyzing item data based in part on the characterization of the current user's item usage and the retrieved independent user related item operational data and the retrieved independent user additional item operational data, wherein the item data analysis is presented to the current user.

38. The method for analyzing post-sale market data for the item of claim 37, wherein the receiving, characterizing, analyzing, and presenting are all performed by web services associated with a post-sale market data analysis system.

39. The method for analyzing post-sale market data for the item of claim 37 wherein the analyzing is done using the characterization of the user's usage as a filter for assessing the operational data received from independent users of one or more qualifying related items.

40. The method for analyzing post-sale market data for the item of claim 39, wherein the item analysis report includes comparisons of the expected performance of respective related items when the related items are used in a manner correlated with the current user's usage characterization.

41. The method for analyzing post-sale market data for the item of claim 37, wherein the analyzing includes filtering of operational data to assess expected item performance when the item is used in a manner correlated with the usage of the current user's usage characterization.

42. The method for analyzing post-sale market data for the item of claim 37, wherein the characterization of the user's usage is used to identify independent item users with similar usage characterizations.

43. The method for analyzing post-sale market data for the item of claim 42, wherein the analyzing modifies a correlation weighting to operational data aggregated from item users with characterizations that are similar or dissimilar to a consumer profile.

44. The method for analyzing post-sale market data for the item of claim 42, wherein recommendations of alternative related item are provided based at least in part on a determination that the related items have been used by users with usage characterizations that are similar to the current user's usage characterization.

45. The method for analyzing post-sale market data for the item of claim 44, wherein the recommendations are also based on the performance of the alternative related items based on one or more of the operational data, user ratings, and pre-sale specifications of the item.

46. The method for analyzing post-sale market data for the item of claim 37, wherein the characterizing is also based on item user specifications of their characteristic usage by said user.

47. The method for analyzing post-sale market data for the item of claim 46, wherein the characterizing is based in part on projected future usage that differs from past usage.

48. The method for analyzing post-sale market data for the item of claim 37, wherein the analyzing is based in part on user specifications of characteristic usage by other users.

49. The method for analyzing post-sale market data for the item of claim 37, wherein the analyzing is based in part on user ratings of the item.

50. The method for analyzing post-sale market data for the item of claim 37, wherein the analyzing is based in part on pre-sale specifications of the item or one or more related items.

51. The method for analyzing post-sale market data for the item of claim 37, wherein the independent users meet demographic or psychographic qualification metrics to qualify for the data analysis.

52. The method for analyzing post-sale market data for the item of claim 37, wherein operational data is automatically collected and transmitted.

53. The method for analyzing post-sale market data for the item of claim 52, wherein the automatic collection and transmission is effectuated by the item or a controller associated with the item.

54. The method of claim 37, further comprising:
   generating simulation data for the item from the operational data.

55. The method of claim 54, wherein the item is a vehicle and the characterization relates to the user's use of the vehicle.

56. The method of claim 37, wherein the item is one of: a product or a service.

57. The method of claim 37, wherein the item is a real item.

58. The method of claim 37, wherein the item is a virtual item.

59. The method of claim 37, wherein the item is a composite item.

60. The method of claim 37, wherein the item involves a consuming device, an adjunct device, or a local or remote server.

61. The method of claim 37, wherein the operational data may include composite item operational data or multi-item-type operational data.

62. The method of claim 37, wherein the analysis may relate to one or more selected item elements within composite item operational data or multi-item-type operational data.

* * * * *